United States Patent
Kitamura

(10) Patent No.: US 6,555,187 B1
(45) Date of Patent: Apr. 29, 2003

(54) SEALING MATERIAL COMPOSITION FOR LIQUID CRYSTAL

(75) Inventor: Tadashi Kitamura, Yokohama (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/701,603

(22) Filed: Nov. 30, 2000

(30) Foreign Application Priority Data

Apr. 1, 1999 (JP) ............................................. 11-94580

(51) Int. Cl.$^7$ ........................ C09K 19/00; B32B 27/38; C08L 63/00; G02F 01/1339; C09J 09/00
(52) U.S. Cl. ...................... 428/1.53; 428/413; 428/414; 428/415; 428/417; 525/523; 525/529; 523/400; 523/440; 349/122; 349/153; 156/99; 156/330
(58) Field of Search ........................ 428/1.1, 1.5, 1.53, 428/413, 414, 415, 417; 525/523, 525, 529; 349/122, 153; 523/400, 440; 156/99, 330

(56) References Cited

U.S. PATENT DOCUMENTS 5,665,797 A * 9/1997 Tahara et al. ................ 523/400
5,898,041 A * 4/1999 Yamada et al. ............. 349/122

FOREIGN PATENT DOCUMENTS

| EP | 0444457 A2 | 9/1991 |
|---|---|---|
| EP | 0632080 A1 | 1/1995 |
| JP | 4-211226 | 8/1992 |
| JP | 7-70286 | 3/1995 |
| JP | 7-199198 | 8/1995 |
| JP | 9-12676 | 1/1997 |
| JP | 9-318953 | 12/1997 |
| JP | 11-15005 | 1/1999 |
| JP | 11-109383 | 4/1999 |

* cited by examiner

Primary Examiner—Robert Dawson
Assistant Examiner—Michael J Feely
(74) Attorney, Agent, or Firm—Burns, Doane, Swecker & Mathis, LLP

(57) ABSTRACT

Provided is a liquid crystal sealant composition in which an aqueous solution obtained by admixing the epoxy resin composition with purified water has an ionic conductivity of 1 mS/m or less; the B stage-reduced product has a viscosity of 50 to 10000 Pa·s at 80 to 100° C.; the cured matter of the above composition has a linear expansion coefficient of $10\times10^{-5}$ mm/mm/° C. or less and a glass transition temperature Tg of 100° C. or higher; and the above cured matter has a moisture permeability of 200 g/m$^2$·24 hours or less at 80° C. and which can meet a liquid crystal display element (cell) produced by a single layer press hot bonding system and exhibits high adhesion reliability and makes it possible to produce a homogeneous liquid crystal display element having a high quality.

42 Claims, No Drawings

SEALING MATERIAL COMPOSITION FOR LIQUID CRYSTAL

TECHNICAL FIELD

The present invention relates to a sealant composition for a liquid crystal display cell, a production process for a liquid crystal display cell and a liquid crystal display element.

BACKGROUND ART

In recent years, a liquid crystal display panel (hereinafter referred to as a liquid crystal display element), having characteristics of a light weight and a thin size has come to be widely used as display panels for various devices including a personal computer. As liquid crystal display elements have come to be increasingly used, a use environment thereof has become more and more severe, and large-sized, homogeneous and high quality liquid crystal display cells have been desired.

A liquid crystal sealant composition means a thermosetting resin composition used for forming a cell prepared by charging liquid crystal between transparent glass substrates or transparent plastic substrates suitably provided with transparent electrodes and an alignment film which are important as members for constituting a liquid crystal display element and sealing it off so that it does not leak outsides.

Proposed are, for example, single liquid type thermosetting liquid crystal sealant compositions comprising an epoxy resin and a hydrazide base potential curing agent for epoxy resin and suitably containing a solvent. The above composition group satisfies sufficiently fundamental performances for sealing characteristics of a liquid crystal cell, that is, an adhesive sealing property, a heat resistance, an electric insulating property and a property of not staining liquid crystal, but bubbles through a seal (seal leak) have been liable to be generated in a single layer press hot bonding system which has been regarded as important as one of production systems for homogeneous and high quality liquid crystal display cells.

On the other hand, particularly a large-sized liquid crystal display has strongly been required in recent rears, and as a substrate used for a liquid crystal cell transfers to a large size, a liquid crystal sealant composition having high adhesion reliability which can meet such a large-sized substrate is required to be developed. At the same time, desired as well to be developed is a liquid crystal sealant composition which can meet a production system of a liquid crystal cell by a single layer press hot bonding system.

Further, the existing situation is that a liquid crystal sealant composition with which a high quality liquid crystal element capable of being used under further severer environment than ever, for.example, under a high humidity environment at 80° C. can be produced has more and more strongly been required in recent years.

In order to produce a more homogeneous and higher quality liquid crystal display panel, a hot bonding step is actively tried to be improved in a production site of the above field. It has so far been recognized that, for example, a system in which many substrates are subjected to hot press bonding in a lump sum is good from a viewpoint of a productivity, and the system has widely been put to practical use. However, the system of the hot press bonding is a production system in which many sets of two substrates for constituting a liquid crystal cell having one substrate coated with a liquid crystal sealant composition are subject to cramping in vacuum in a piled-up state and then go through a hot bonding step in a heating furnace, and it has had the problem that the cells tend to make more or less a difference in a quality depending on upper, middle and lower positions in the pile.

Accordingly, the existing situation is that a single layer press hot bonding system, that is, a method in which a set of two transparent substrates for a liquid crystal cell is subjected set by set to hot press bonding for sealing has come to be proposed.

In the above single layer press hot bonding system, however, a publicly known liquid crystal sealant composition of a single liquid hot curing type has been liable to bring about problems such as generation of bubbles through a seal (seal leak), a marked disturbance in a seal width and an increase in stain in the vicinity of a sealed part (generation of inferior liquid crystal display).

Accordingly, the existing situation is that strongly required is a novel liquid crystal sealant composition which can meet the single layer press hot bonding system and exhibit high productivity and which is durable under a high humidity environment of 80° C.

Under such social background as described above, a subject to be solved is to provide a liquid-crystal sealant composition which can meet a substrate for a large-sized liquid crystal element and exhibit high productivity in the single layer press hot bonding system and which can provide a liquid crystal element durable over a long period of time even under a high humidity environment of 80° C., more specifically to provide a liquid crystal sealant composition which is highly fitted to single layer press and in which a liquid crystal display cell obtained using the composition is excellent in a heat resistance and a moisture barrier property and can secure dimensional stability and long-time display stability.

Further, another subject is to provide a production process for a liquid crystal cell using the above liquid crystal sealant composition.

DISCLOSURE OF THE INVENTION

Intensive investigations repeated by the present inventors in order to solve the subjects described above have resulted in finding that the subjects described above can be achieved by a composition comprising a specific epoxy resin, a specific potential curing agent for epoxy resin, a specific rubber-like polymer fine particle, a specific inorganic filler, a specific high softening point-polymer fine particle, and if necessary, a silane coupling agent, a curing accelerator, a solvent and a gap-forming controller each falling in a specific range, and thus the present invention has been completed.

That is, the liquid crystal sealant composition of the present invention comprises the following items [1] to [11]:

[1] A liquid crystal sealant-composition comprising an epoxy resin composition, wherein
  (a) an aqueous solution obtained by admixing the above composition with the same mass of purified water has an ionic conductivity of 1 mS/m or less and
  (b) a coated material obtained by coating the above epoxy resin composition in a thickness of 50 $\mu$m and subjecting it to heat treatment at 80 to 100° C. for 20 minutes has a viscosity of 50 to 10000 Pa·s at 80 to 100° C. by an E type viscometer; and in a cured matter of the above epoxy resin composition,
  (c) the cured matter of the above composition has a linear expansion coefficient of $10 \times 10^{-5}$ mm/mm/° C. or less at 0° C. to 100° C., which is determined by means of a thermomechanical analyzer (TMA), (d) the cured matter of the above composition has a glass transition temperature Tg of 100° C. or higher, which is deteried by means of a thermomechanical analyzer (TMA), and (e) a cured matter having a thickness of 100 μm which is formed from the above composition has a moisture permeability of 200 g/m²·24 hours or less at 80° C. at which moisture passes through the above cured matter.

[2] The liquid crystal sealant composition as described in the above item [1], comprising:

20 to 88.9 mass % of an epoxy resin (1) having 1.2 or more epoxy groups on an.average in a molecule, 1 to 15 mass % of a rubber-like polymer fine particle (2) having a softening point of 0° C. or lower and a primary particle diameter of 5 μm or less, 5 to 50 mass % of an inorganic filler (3), 5 to 30 mass.% of a thermally active potential curing agent for epoxy resin (4), and 0.1 to 9.5 mass % of a high softening point-polymer fine particle (5) having a softening point of 50° C. or higher and a primary particle diameter of 2 μm or less.

[3] The liquid crystal sealant composition as described in the above item [2], further comprising 0.1 to 5 mass % of a silane coupling agent (6) and 0.1 to 10 mass % of a curing accelerator (7).

[4] The liquid crystal sealant composition as described in the above item [2] or [3], further comprising 1 to 25 mass % of a solvent (8) which is compatible with the epoxy resin and has a boiling point falling in a range of 150 to 230° C.

[5] The liquid crystal sealant composition as described in any of the above items [2] to [4], further comprising 0.1 to 5 mass % of a gap-forming controller (9).

[6] The liquid crystal sealant composition as described in any of the above items [2] to [5], wherein a maximum exothermic peak temperature determined from a thermogram obtained by differential scanning calorimetry (DSC) in which 10 mg of the composition described above is heated at a constant rate of 5° C./minute in an inert gas atmosphere falls in a range of 135 to 180° C.

[7] The liquid crystal sealant composition as described in any of the above items [2] to [6], wherein the composition described above is a single-liquid type epoxy resin composition, and an exothermic initiation temperature determined from a thermogram obtained by differential scanning calorimetry (DSC) in which 10 mg of the liquid crystal sealant composition is heated at a constant rate of 5° C./minute in an inert gas atmosphere falls in a range of 60 to 130° C.

[8] The liquid crystal sealant composition described in any of the above items [4] to [7], wherein the epoxy resin (1) described above is an epoxy resin having 1.7 or more epoxy groups on an average in a molecule and has a polystyrene-reduced number average molecular weight of 7000 or less which is determined by gel permeation chromatography measurement.

[9] The liquid crystal sealant composition as described in any of the above items [4] to [8], wherein the rubber-like polymer fine particle (2) and the high softening point-polymer fine particle (5) described above are present in the state that they are dispersed in the epoxy resin in the form of particles respectively.

[10] The liquid crystal sealant composition as described in any of the above items [4] to [9], wherein the high softening point-polymer fine particle (5) is a high softening point-polymer fine particle which comprises a poly(meth)acrylate having a micro cross-linking.structure as a main component and has a softening point of 60 to 150° C. and a primary particle diameter falling in a range of 0.01 to 5 μm and which contains an epoxy group introduced into a polymer component in a proportion of 0.1 to 5 mass %.

[11] The liquid crystal sealant composition as described in any of the above items [4] to [10], wherein at least a part of the inorganic filler (3) is graft-bonded with 1 to 50 mass parts of the epoxy resin or the silane coupling agent per 100, mass parts of the inorganic filler in terms of a grafting rate represented by a mass increasing rate determined by a repetitive solvent-washing method.

[12] The liquid crystal sealant composition as described in any of the above items [4] to [11], wherein the solvent (8) described above is at least one selected from a ketone solvent, an ether solvent and an ester solvent each having a boiling point falling in a range of 150 to 230° C.

[13] A production process for a liquid crystal display cell, comprising:

printing or dispenser-coating the liquid crystal sealant composition as described in any of the above items [1] to [12] on a bonding-sealing part of a glass-made or plastic-made substrate for a liquid crystal cell and precuring it at 70 to 120° C., then adjusting the position in a pair with a substrate which is not subjected to the treatment described above, subjecting the paired substrates to hot press treatment at 100 to 200° C. to bond and fix in a homogeneous thickness falling in a range of 3 to 7 μm to form a cell, and then charging a liquid crystal material into the above cell and sealing the injection port with a two-liquid type liquid crystal sealant composition.

[14] A liquid crystal display element obtained by:

printing or dispenser-coating the liquid crystal sealant composition as described in any of the above items [1] to [12] on a bonding-sealing part of a glass-made or plastic-made substrate for a liquid crystal cell and precuring it at 70 to 120° C., then adjusting the position in a pair with a substrate which is not subjected to the treatment described above, subjecting the paired substrates to hot press treatment at 100 to 200° C. to bond and fix in a homogeneous thickness falling in a range of 3 to 7 μm to obtain a cell, and then charging a liquid crystal material into the above cell and sealing the injection port with a two-liquid type liquid crystal sealant composition.

BEST MODE FOR CARRYING OUT THE INVENTION

The liquid crystal sealant composition of the present invention is a composition, wherein:

(a) an aqueous solution obtained by admixing the above composition with the same mass of purified water has an ionic conductivity of 1 mS/m or less and (b) a coated material obtained by coating the above epoxy resin composition in a thickness of 50 μm and subjecting it to heat treatment at 80 to 100° C. for 20 minutes has an a viscosity of 50 to 10000 Pa·s at 80 to 100° C. by an E type viscometer; and in a cured matter of the above epoxy resin composition, (c) the cured matter of the above composition has a linear expansion coefficient of $10 \times 10^{-5}$ mm/mm/° C. or less at 0 to 100° C., which is determined by means of a thermomechanical analyzer (TMA), (d) the cured matter of the above composition has a glass transition temperature Tg of 100° C. or higher, which is determined by means of a thermomechanical analyzer (TMA), and (e) the cured matter of the above composition having a thickness of 100 μm has moisture permeability of 200 g/m²·24 hours or less at 80° C. at which moisture passes through the above cured matter.

The condition of (b) is, for example, a physical property required for a sealing material in a hot bonding step in producing a large-sized liquid-crystal display, to be more specific, in a B stage. A viscosity of this B stage-reduced composition by an E type viscometer is controlled to 50 Pa·s or more at 80 to 100° C., whereby seal leak is notably inhibited from being generated, for example, at the time of single layer press hot press bonding (hereinafter referred to merely as single layer press or single layer hot press), and they are substantially prevented from being generated. Also, the viscosity is controlled to 10000 Pa·s or less at 80 to 100° C., whereby it becomes easy to control the desired gap width, for example, at the time of single layer press hot press bonding, and the work efficiency is raised. Accordingly, it is preferred.

Further, the composition obtained after the heat treatment described above has a viscosity falling more preferably in a range of 75 to 5000 Pa·s at 80 to 100° C. by an E type viscometer, particularly preferably 100 to 1000 Pa·s.

The liquid crystal sealant composition of the present invention has a maximum exothermic peak temperature falling preferably in a range of 135 to 180° C., which is determined from a thermogram obtained by differential scanning calorimetry (DSC) in which 10 mg of the liquid crystal sealant composition of the present invention is heated at a constant rate of 5° C./minute in an inert gas environment. The peak temperature controlled to 135° C. or higher can secure the quick curing property at a low temperature at the time of single layer hot press bonding. On the other hand, the peak temperature controlled to 180° C. or lower can avoid the production conditions of a liquid crystal cell from becoming severer than needed.

When the liquid crystal sealant composition of the present invention is a single-liquid type epoxy resin composition, the exothermic initiation temperature determined from a thermogram obtained by differential scanning calorimetry (DSC) in which 10 mg of the liquid crystal sealant composition is heated at a constant rate of 5° C./minute in an inert gas environment falls preferably in a range of 60 to 130° C. The initiation temperature controlled to 60° C. or higher can secure the viscosity stability in handling the liquid crystal sealant composition in the vicinity of room temperature. On the other hand, the initiation temperature controlled to 130° C. or lower can secure the quick curing property at a low temperature at the time of single layer hot press bonding.

A moisture permeability of the cured matter of the liquid crystal sealant composition at 80° C. is controlled to a specific range, whereby durability of liquid crystal can be notably be elevated. That is, the moisture permeability at 80° C. represented by a permeating amount of moisture passing through the cured film of the liquid crystal sealant composition having a thickness of 100 μm for 24 hours under an environment of 80° C. and 95% relative humidity is controlled to 200 g/m²·24 hours or less, whereby moisture can notably be inhibited from penetrating into the liquid crystal display cell for short time, which results in preventing uneven display and a reduction in response speed. Stable operation even under a high temperature and a high humidity, which is particularly required in recent years, can be maintained over a long period of time.

In the liquid crystal sealant composition of the present invention, the moisture permeability at 80° C. is controlled more preferably to less than 150 g/m²·24 hours, particularly preferably less than 100 g/m²·24 hours.

Further, the glass transition temperature characteristic (Tg characteristic) of the cured matter of the liquid crystal sealant composition is controlled to a specific range, whereby a range of the usable area of liquid crystal can be expanded. In particular, it becomes possible to use it under a higher temperature than required in recent years. That is, the glass transition temperature (Tg) of the cured matter, which is determined by means of a thermomechanical analyzer (TMA) is controlled to 100° C. or higher, whereby it becomes possible to use the resulting liquid crystal display element at a higher display reliability temperature for long time. To be more specific, the reliability can be secured when the resulting liquid crystal display element is exposed for long time under a high temperature environment of 80° C. The glass transition temperature is more preferably 110° C. or higher and falls particularly preferably in a range of 115 to 180° C.

Further, the linear expansion coefficient of the cured matter of the liquid crystal sealant composition at 0 to 100° C. is controlled to a specific range, whereby the dimensional stability of the resulting liquid crystal display element can be secured. The linear expansion coefficient of the cured matter of the liquid crystal sealant composition is controlled to $10 \times 10^{-5}$ mm/mm/° C. or less, whereby disordered display and a reduction in the response speed can be prevented for long time even under a high temperature and a high humidity.

In the liquid crystal sealant composition of the present invention, the linear expansion coefficient of the cured matter which is determined by means of a thermomechanical analyzer (hereinafter referred to merely as TMA) is controlled preferably to less than $5 \times 10^{-5}$ mm/mm/° C., particularly preferably less than $3 \times 10^{-5}$ mm/mm/° C.

In the liquid crystal sealant composition of the present invention, a barometer of a free ion concentration in the liquid crystal sealant composition is an ionic conductivity of an aqueous solution prepared by admixing the liquid crystal sealant composition with the same mass of purified water for 5 to 30 minutes, and the ionic conductivity thereof is controlled to 1 ms/m or less. The long-term display functionality of the finally resulting liquid crystal display element can be maintained by controlling the ionic conductivity thereof to 1 ms/m or less. It is controlled preferably to 0.5 mS/m or less, particularly preferably 0.2 mS/m or less.

The liquid crystal sealant composition of the present invention comprises an epoxy resin (1) having 1.2 or more epoxy groups on an average in a molecule [hereinafter referred to merely as the epoxy resin (1)], a rubber-like polymer fine particle (2) having a softening point of 0° C. or lower and a primary particle diameter of 5 μm or less, an inorganic filler (3), a thermally active potential curing agent for epoxy resin (4) [hereinafter referred to merely as the curing agent (4)], a high softening point-polymer fine particle (5) having a softening point of 50° C. or higher and a primary particle diameter of 2 μm, and if necessary, a silane coupling agent (6), a curing accelerator (7), a solvent (8) which is compatible with the epoxy resin and inactive to an epoxy group [hereinafter referred to merely as the solvent (8)], a gap-forming agent (9) and other additives.

Next, the structural components shall specifically be explained.

(1) Epoxy Resin

The epoxy resin (1) used in the present invention is an epoxy resin having 1.2 or more epoxy groups on an average in a molecule. It has preferably 1.7 or more epoxy groups, particularly preferably 2 to 6 epoxy groups on an average in a molecule. The epoxy group is controlled to 1.2 or more groups on an average in a molecule, whereby the heat resistance is improved. The epoxy resin may be a single resin or a mixture of different resins, and the resins which are either solid or liquid at room temperature can be used.

The epoxy resins used in the present invention shall not specifically be restricted as long as they are epoxy resins having the prescribed epoxy groups or a mixture thereof, and mixture of monofunctional epoxy resins and multifunctional epoxy resins or the multifunctional epoxy resins alone or a mixture thereof can be used. Further, modified epoxy resins thereof can preferably be used as well. Though not specifically be restricted, the number of functional groups per a molecule of the epoxy resin contained in the liquid crystal sealant composition can be determined by the epoxy group equivalent and the mass average molecular weight which is obtained by fractionating by means of a liquid chromatography.

The particularly preferred epoxy resin (1) has an ionic conductivity of preferably 2 mS/m or less, more preferably 1 mS/m or less and particularly preferably 0.5 mS/m or less in terms of an ionic conductivity of extract water which is obtained by contacting and mixing the single resin or the mixture of a plurality thereof with the same mass of purified water for 30 minutes.

If the above extract water has an ionic conductivity of 2 mS/m or less, a free ion can notably be inhibited or substantially avoided from transferring to the liquid crystal phase in bringing liquid crystal into contact with the cured matter of the finally obtained liquid crystal sealant composition of the present invention. When two or more different kinds of the epoxy reins are used, the total content of the free ions contained in the mixture thereof better satisfies the requisite described above.

The epoxy resin (1) is preferably a mixture of an epoxy resin (1-1) which is liquid in a temperature range of 0 to 50° C. and an epoxy resin (1-2) which is solid in a temperature range of 0 to 50° C. Also, the above mixture preferably becomes liquid at 0 to 120° C.

The epoxy resin (1-2) which is solid in a temperature range of 0 to 50° C. in the mixture is preferably at least one resin selected from a cresol novolak type epoxy resin, a bisphenol A type epoxy resin, a bisphenol F type epoxy resin, a triphenolmethane type epoxy resin and a triphenolethane type epoxy resin, or a mixture thereof.

In the epoxy resin (1), a mixing mass proportion of the epoxy resin (1-1) which is liquid in a temperature range of 0 to 50° C. to the epoxy resin (1-2) which is solid in a temperature range of 0 to 50° C. is expressed by (1-1:1-2) and falls preferably in a range of (5:95) to (70:30), more preferably (10:90) to (40:60).

The epoxy resin (1) is a resin having a polystyrene-reduced mass average molecular weight falling preferably in a range of 7000 or less, more preferably 150 to 3000 and most preferably 350 to 2000, which is determined by means of a gel permeation chromatography (hereinafter referred to merely as GPC).

The polystyrene-reduced mass average molecular weight determined by means of GPC is controlled to 7000 or less, whereby a viscosity of the composition obtained by an E type viscometer after heat treatment at 80 to 100° C. for 20 minutes can be controlled to 50 to 10000 Pa·s at 80 to 100° C., and the single layer press hot press bonding aptitude can be improved further more. On the other hand, the polystyrene-reduced mass average molecular weight is controlled to 150 or more, whereby a cross-linking density of the resulting cured matter can be maintained high, and the reliability of heat resistant sealing can be secured. Accordingly, such molecular weight is preferred.

A content of the epoxy resin (1) is 20 to 88.9 mass %, preferably 30 to 70 mass % based on the liquid crystal sealant composition.

In the following epoxy resins, allowed to be used as well are epoxy resins which are directly synthesized or resins which are refined or highly purified, so that they satisfy the requisites described above. Any method can be used as the refining method as long as refining can be carried out so that an ionic conductivity of extract water obtained by contacting and mixing the resin with the same mass of purified water for 10 to 30 minutes falls in the prescribed range. It includes, for example, a water washing-solvent extraction refining method, a ultrafiltration method and a distillation refining method.

<Monofunctional Epoxy Resin>

The monofunctional epoxy resin used in the present invention includes, for example, aliphatic monoglycidyl ether compounds, alicyclic monoglycidyl ether compounds, aromatic monoglycidyl ether compounds, aliphatic monoglycidyl ester compounds, aromatic monoglycidyl ester compounds, alicyclic monoglycidyl ester compounds, nitrogen-containing monoglycidyl ether compounds, monoglycidylpropylpolysiloxane compounds and monoglycidylalkanes. It goes without saying that monofunctional epoxy resins other than these resins may be used.

(Aliphatic Monoglycidyl Ether Compound)

Included are, for example, aliphatic monoglycidyl ether compounds obtained by a reaction of polyalkylene glycol monoalkyl ethers having an alkyl group having 1 to 6 carbon atoms with epichlorohydrin and aliphatic monoglycidyl ether compounds obtained by a reaction of aliphatic alcohols with epichlorohydrin.

The polyalkylene glycol monoalkyl ethers having an alkyl group having 1 to 6 carbon atoms include ethylene glycol monoalkyl ethers, diethylene glycol monoalkyl ethers, triethylene glycol monoalkyl ethers, polyethylene glycol monoalkyl ethers, propylene glycol monoalkyl ethers, dipropylene glycol monoalkyl ethers, tripropylene glycol monoalkyl ethers and polypropylene glycol monoalkyl ethers.

Aliphatic alcohols include, for example, n-butanol, isobutanol, n-octanol, 2-ethylhexyl alcohol, dimethylolpropane monoalkyl ethers, trimethylolpropane dialkyl ethers, glycerin dialkyl ethers, dimethylolpropane monoalkyl esters, trimethylolpropane dialkyl esters and glycerin dialkyl esters.

(Alicyclic Monoglycidyl Ether Compound)

Included are, for example, alicyclic monoglycidyl ether compounds obtained by a reaction of alicyclic alcohols having a saturated cyclic alkyl group having 6 to 9 carbon atoms with epichlorohydrin.

The alicyclic alcohols used for the reaction include cyclohexanol and the like.

(Aromatic Monoglycidyl Ether Compound)

Included are, for example, aromatic monoglycidyl ether compounds obtained by a reaction of aromatic alcohols with epichlorohydrin.

The aromatic alcohols used for the reaction include phenol, methylphenol, ethylphenol, n-propylphenol, isopropylphenol, n-butylphenol, benzyl alcohol, t-butylphenol, xylenol and naphthol.

(Aliphatic or Aromatic Monoglycidyl Ester Compound)

Included are, for example, aliphatic monoglycidyl ester compounds or aromatic monoglycidyl ester compounds obtained by a reaction of aliphatic dicarboxylic acid monoalkyl esters or aromatic dicarboxylic acid monoalkyl esters with epichlorohydrin.

<Multifunctional Epoxy Resin>

A multifunctional epoxy resin is an epoxy resin having usually 2 to 6 epoxy groups on an average in a molecule, but epoxy resins having more epoxy groups can be used as well, as long as the effects of the present invention are not damaged.

The multifunctional epoxy resin includes, for example, aliphatic polyglycidyl ether compounds, aromatic polyglycidyl ether compounds, trisphenol type polyglycidyl ether compounds, hydroquinone type polyglycidyl ether compounds, resorcinol type polyglycidyl ether compounds, aliphatic polyglycidyl ester compounds, aromatic polyglycidyl ester compounds, aliphatic polyglycidyl etherester compounds, aromatic polyglycidyl etherester compounds, alicyclic polyglycidyl ether compounds, aliphatic polyglycidyl amine compounds, aromatic polyglycidyl amine compounds, hydantoin type polyglycidyl compounds, biphenyl type polyglycidyl compounds, novolak type polyglycidyl ether compounds and epoxidized diene polymers. It goes without saying that multifunctional epoxy resins and modified epoxy resins other than these compounds can be used as well. The compounds, the resins and the modified resins each described above may be used alone or in combination of a plurality thereof.

(Aliphatic Polyglycidyl Ether Compound)

Included are, for example, aliphatic polyglycidyl ether compounds obtained by a reaction of polyalkylene glycols or polyhydric alcohols with epichlorohydrin.

The polyalkylene glycols used for the reaction include, for example, ethylene glycol, diethylene glycol, triethylene glycol, polyethylene glycol, propylene glycol, dipropylene glycol, tripropylene glycol and polypropylene glycol.

The polyhydric alcohols used for the reaction include dimethylolpropane, trimethylolpropane, spiroglycol and glycerin.

(Aromatic Polyglycidyl Ether Compound)

Included are, for example, aromatic polyglycidy ether compounds obtained by a reaction of aromatic diols with epichlorohydrin.

The aromatic diols used for the reaction include, for example, bisphenol A, bisphenol S, bisphenol F and bisphenol AD.

(Trisphenol Type Polyglycidyl Ether Compound)

Included are, for example, trisphenol type polyglycidyl ether compounds obtained by a reaction of trisphenols with epichlorohydrin.

The trisphenols used for the reaction include 4,4',4"-methylidenetrisphenol, 4,4',4"-methylidenetris(2-methylphenol), 4,4'-[(2-hydroxyphenyl)methylene]bis-[2,3,6-trimethylphenol], 4,4',4"-ethylidenetrisphenol, 4,4'-[(2-hydroxyphenyl)methylene]bis[2-methylphenol], 4,4'-[(2-hydroxyphenyl)ethylene]bis[2-methylphenol], 4,4'-[(4-hydroxyphenyl)methylene]bis[2-methylphenol], 4,4'-[(4-hydroxyphenyl)ethylene]bis[2-methylphenol], 4,4'-[(2-hydroxyphenyl)methylene]bis[2,6-dimethylphenol], 4,4'-[(2-hydroxyphenyl)ethylene]bis[2,6-dimethylphenol], 4,4'-[(4-hydroxyphenyl)methylene]bis[2,6-dimethylphenol], 4,4'-[(4-hydroxyphenyl)ethylene]bis[2,6-dimethylphenol], 4,4'-[(2-hydroxyphenyl)methylene]bis[3,5-dimethylphenol], 4,4'-[(2-hydroxyphenyl)ethylene]bis[3,5-dimethylphenol], 4,4'-[(3-hydroxyphenyl)methylene]bis[2,3,6-trimethyl-phenol], 4,4'-[(4-hydroxyphenyl)methylene]bis[2,3,6-trimethylphenol], 4,4'-[(2-hydroxyphenyl)methylene]bis-[2-cyclohexyl-5-methylphenol], 4,4'-[(3-hydroxyphenyl)-methylene]bis-[2-cyclohexyl-5-methylphenol], 4,4'-[(4-hydroxyphenyl)methylene]bis[2-cyclohexyl-5-methylphenol], 4,4'-[1-[4-[1-(4-hydroxyphenyl)-1-methylethyl]phenol-ethylidene]bisphenol], 4,4'-[(3,4-dihydroxyphenyl)-methylene]bis[2-methylphenol], 4,4'-[(3,4-dihydroxyphenyl)methylene]bis[2,6-dimethylphenol], 4,4'-[(3,4-dihydroxyphenyl)methylene]bis[2,3,6-trimethylphenol] and 4-[bis(3-cyclohexyl-4-hydroxy-6-methylphenyl)methyl]-1,2-benzenediol.

(Hydroquinone Type Polyglycidyl Ether Compound)

Included are, for example, hydroquinone type polyglycidyl ether compounds obtained by a reaction of hydroquinone with epichlorohydrin.

(Resorcinol Type Polyglycidyl Ether Compound)

Included are, for example, resorcinol type polyglycidyl ether compounds obtained by a reaction of resorcinol with epichlorohydrin.

(Aliphatic Polyglycidyl Ester Compound)

Included are, for example, aliphatic polyglycidyl ester compounds obtained by a reaction of aliphatic dicarboxylic acids represented by adipic acid with epichlorohydrin.

(Aromatic Polyglycidyl Ester Compound)

Included are, for example, aromatic polyglycidyl ester compounds obtained by a reaction of aromatic polycarboxylic acids with epichlorohydrin.

The aromatic polycarboxylic acids used for the reaction include, for example, isophthalic acid, terephthalic acid and pyromellitic acid.

(Aliphatic or Aromatic Polyglycidyl Etherester Compound)

Included are, for example, aliphatic polyglycidyl etherester compounds or aromatic polyglycidyl etherester compounds obtained by a reaction of hydroxydicarboxylic acid compounds with epichlorohydrin.

(Alicyclic Polyglycidyl Ether Compound)

Included are, for example, alicyclic polyglycidyl ether compounds represented by dicyclopentadiene type polyglycidyl ether compounds.

(Aliphatic Polyglycidyl Amine Compound)

Included are, for example, aliphatic polyglycidyl amine compounds obtained by a reaction of aliphatic polyamines represented by ethylenediamine, diethylenetriamine and triethylenetetraamine with epichlorohydrin.

(Aromatic Polyglycidyl Amine Compound)

Included are, for example, aromatic polyglycidyl amine compounds obtained by a reaction of aromatic amines represented by diaminodiphenylmethane, aniline and met-axylilenediamine with epichlorohydrin.

(Hydantoin Type Polyglycidyl Compound)

Included are, for example, hydantoin type polyglycidyl compounds obtained by a reaction of hydantoin and derivatives thereof with epichlorohydrin.

(Novolak Type Polyglycidyl Ether Compound)

Included are, for example, novolak type polyglycidyl ether compounds obtained by a reaction of novolak resins derived from formaldehyde and aromatic alcohols represented by phenol, cresol and naphthol with epichlorohydrin. Further, representative examples thereof include, for example, modified phenol novolak resins obtained by a reaction of modified phenol resins which are derived from phenol and p-xylylenedichloride and in which a phenol nucleus and a paraxylene nucleus are combined with a methylene bond with epichlorohydrin.

(Epoxidized Diene Polymer)

Included are, for example, epoxidized polybutadiene and epoxidized polyisoprene.

<Modified Epoxy Resin>

Representative are addition derivative compositions comprising at least one selected from the epoxy resins described above and at least one selected from amine compounds, mercapto compounds and carboxyl compounds. The above addition derivative compositions are preferably those which do not separate into phases per se and which are liquid or solid at room temperature.

Specific examples of the amine compounds, the mercapto compounds and the carboxyl compounds which are suitably used for producing the modified epoxy resins shall be given below respectively.

[Amine Compound]

Given as representative examples thereof are, for example, aliphatic amines, alicyclic amines, aromatic amines, polyamides, polyamideamines, cyanamides, amino group-containing low molecular polysiloxanes, amino group-containing low molecular butadiene-acrylonitrile copolymers and amino group-containing low molecular acryl compounds.

(Aliphatic Amines)

They shall not specifically be restricted as long as they are aliphatic amine monomers. They are represented by, for example, monoethanolamine, diethanolamine, ethylenediamine, diethylenetriamine, triethylenetetraamine, hexamethylenediamine, propylenediamine, dipropylenetriamine, polyethylene glycol monoamine, polyethylene glycol diamine, polypropylene glycol monoamine and polypropylene glycol diamine.

(Alicyclic Amines)

They shall not specifically be restricted as long as they are alicyclic amine monomers. Representative are, for example, isophoronediamine, cyclohexyldiamine, norbornanediamine, piperidine, bisaminopropyltetraoxaspiroundecane and modified polyamines thereof.

(Aromatic Amines)

They shall not specifically be restricted as long as they are aromatic amine monomers. Representative are, for example, phenylenediamine, xylylenediamne, diaminodiphenylmethane, diaminodiphenylsulfone and modified polyamines thereof.

(Polyamides)

They may be any ones as long as they are polyamides and shall not specifically be restricted. They are represented by, for example, dehydrated condensed derivatives of at least one polyamine compound selected from the aliphatic amines, the alicyclic amines and the aromatic amines each described above with dicarboxylic acid compounds.

(Polyamideamines)

They may be any ones as long as they are polyamideamines and shall not specifically be restricted. They are represented by, for example, dehydrated condensed derivatives of at least one amine selected from the aliphatic amines, the alicyclic amines and the aromatic amines each described above with dicarboxylic acid compounds or aminocarboxylic acid compounds.

(Cyanamides)

They may be any ones as long as they are cyanamides and shall not specifically be restricted. They are represented by, for example, dicyanediamide.

(Amino Group-containing Low Molecular Polysiloxanes)

They may be any ones as long as they are amino group-containing low molecular polysiloxanes and shall not specifically be restricted. They are represented by, for example, polysiloxanes having an amino group at both ends and having an amine equivalent of 2000 or less. (Amino group-containing Low Molecular Butadiene-acrylonitrile Copolymers)

They may be any ones as long as they are amino group-containing low molecular butadiene-acrylonitrile copolymers and shall not specifically be restricted. They are represented by, for example, butadiene-acrylonitrile copolymers having an amino group at both ends and having an amine equivalent of 2000 or less and an acrylonitrile monomer-reduced content of 16 to 30 mass %.

(Amino Group-containing Low Molecular Acryl Compounds)

They may be any ones as long as they are amino group-containing low molecular acryl compounds and shall not specifically be restricted. They are represented by, for example, polyamino group-containing acryl compounds having an amine equivalent of 2000 or less and an SP value (solubility parameter) of 8.5 to 10 which is a barometer of affinity.

[Mercapto compound]

It may be any ones as long as it is a mercapto compound and shall not specifically be restricted. Given as examples thereof are, for example, MR-6 and MR-7 which are products manufactured by Mitsui Chemicals Inc. and polysiloxanes having a mercapto group at both ends and having an amine equivalent of 2000 or less.

[Carboxyl Compounds]

They may be any ones as long as they are carboxylic acid monomers and/or polycarboxylic acid compounds and shall not specifically be restricted. Given as representative examples thereof are, for example, carboxylic acid monomers having 20 or less carbon atoms represented by maleic acid, maleic acid anhydride, itaconic acid, adipic acid, trimellitic acid, trimellitic acid anhydride, phthalic acid, phthalic acid anhydride, tetrahydrophthalic acid, tetrahydrophthalic acid anhydride, himic acid, nadic acid anhydride and glutaric acid anhydride, and polyesters having an acid group at an end derived from them and dihydroxy compounds.

Another examples thereof include polysiloxanes, butadiene-acrylonitrile copolymers and low molecular acryl compounds each of which has a carboxyl group at both ends and has an acid value of 5 to 100 mg KOH/g.

In the liquid crystal sealant composition of the present invention, the epoxy resin (1) alone has preferably a viscosity by an E type viscometer of not less than 0.3 Pa·s at 80° C. It falls more preferably in a range of 1 Pa·s or more, particularly preferably 5 to 1000 Pa·s. If the epoxy resin (1) alone has a viscosity by an E type viscometer of more than 0.3 Pa·s at 80° C., the single layer hot press aptitude of the liquid crystal sealant composition is elevated.

(2) Rubber-like Polymer Fine Particle Having a Softening Point of 0° C. or Lower and a Primary Particle Diameter of 5 µm or Less In the liquid crystal sealant composition of the present invention, contained is 1 to 15 mass % of the rubber-like polymer fine particle (2) which has a softening point of 0° C. or lower in terms of a softening point determined by means of a torsional braid analyzer (hereinafter referred to merely as TBA) called a torsional pendulum method and which has a primary particle average diameter of 5 µm or less determined by electron microscope observation (hereinafter referred to merely as the rubber-like polymer fine particle).

The rubber-like polymer fine particle has more preferably an average primary particle diameter of 0.01 to 5 μm, further preferably 0.01 to 3 μm and particularly preferably 0.05 to 2 μm.

The rubber-like polymer fine particle is used in a proportion of 1 mass % or more in the liquid crystal sealant composition of the present invention, whereby a relaxation effect of a residual distortion in a liquid crystal display element itself produced with using the liquid crystal sealant composition of the present invention is derived, and as a result, the adhesion reliability can be raised. Accordingly, such proportion is preferred. On the other hand, this is controlled to 15 mass % or less, whereby the heat resistant rigidity required to the cured matter can be preferably secured. It is added more preferably in a range of 3 to 12.5 mass %. In particular, the rubber-like polymer fine particle (2) accounts more preferably for 5 to 10 mass % in terms of a proportion based on the liquid crystal sealant composition.

Also, the softening point of the rubber-like polymer fine particle (2) is controlled to 0° C. or lower, whereby the adhesion reliability tends to be raised more at a low temperature, and therefore it is preferred. Further, the primary particle diameter of the rubber-like polymer fine particle (2) is controlled to 5 μm or less, whereby a gap in the liquid crystal cell can be thinned, and a use amount of expensive liquid crystal can be controlled. In addition thereto, the liquid crystal display response speed can be improved as well.

The preferred rubber-like polymer fine particle (2) includes a silicone rubber fine particle and/or an acryl rubber fine particle or a polyolefin rubber fine particle each having a softening point of −30° C. or lower and a primary particle diameter of 0.01 to 3 μm, and the rubber-like polymer fine particle is more preferably a cross-linking rubber particle.

The following known rubber-like polymers can suitably be selected and used for these rubber-like polymer fine particles as long as they have a softening of 0° C. or lower.

Given as examples thereof are, for example, rubber-like polymers of an acryl rubber base, rubber-like polymers of a silicone rubber base, rubber-like polymers of a conjugated diene rubber base, rubber-like polymers of an olefin rubber base, rubber-like polymers of a polyester rubber base, rubber-like polymers of a urethane rubber base, composite rubber and rubber-like polymers having a functional group reacting with an epoxy group. In particular, these rubber-like polymers have preferably a functional group reacting with an epoxy group.

These rubber-like polymers (2) used for the liquid crystal sealant composition may be used alone or in combination of a plurality thereof.

Specific examples of these rubber-like polymer fine particles shall be shown below.
<Rubber-like Polymer Fine Particle of an Acryl Rubber Base>

Specific examples of the rubber-like polymer fine particle of an acryl rubber base include, for example, a method using particles obtained by drying a core/shell type emulsion in which a core part comprises acryl rubber, a method using in the form of a resin composition obtained by subjecting an acryl base monomer to non-aqueous dispersion polymerization in an epoxy resin and a method using in the form of a resin composition obtained by preparing separately a solution of an acryl rubber polymer into which a functional group reacting with an epoxy group is introduced, and then pouring or dropwise adding it into an epoxy resin to mechanically mix, followed by removing the solvent from the solution or grafting the acryl rubber to the epoxy resin to stably disperse acryl rubber fine particles in the epoxy resin.
<Rubber-like Polymer Fine Particle of a Silicone Rubber Base>

Specific examples of the rubber-like polymer fine particle of a silicone rubber base include, for example, a method using powdery silicone rubber fine particles and a method using in the form of a resin composition obtained by introducing a double bond into an epoxy resin, reacting the epoxy resin with a silicone macro monomer having an acrylate group at a single end which is capable of reacting with the double bond and then charging vinyl silicone and hydrogen silicone into the reaction product to dispersion polymerize. Also, it includes a method using in the form of a resin composition obtained by reacting a reactive silicone oil in which a functional group capable of reacting with an epoxy group is introduced into both ends thereof and which has a molecular weight of 10,000 to 300,000. Further, other silicone rubber-like polymers can be used as well without any specific restrictions.
<Rubber-like Polymer Fine Particle of a Conjugated Diene Rubber Base>

Specific examples of the rubber-like polymer fine particle of a conjugated diene rubber base include, for example, conjugated diene rubber-like polymer fine particles obtained by polymerizing or copolymerizing monomers such as 1,3-butadiene, 1,3-pentadiene, isoprene, 1,3-hexadiene and chloroprene. They shall not specifically be restricted, and commercial products may be used as they are. More specific examples of the conjugated diene rubber include a copolymer of butadiene with acrylonitrile, a copolymer of butadiene with acrylonitrile having a carboxyl group at an end and a copolymer of butadiene with acrylonitrile having an amino group at an end.
<Rubber-like Polymer Fine Particle of an Olefin Rubber Base>

Specific examples of the rubber-like polymer fine particle of an olefin rubber base include, for example, fine particles comprising amorphous homopolymers of ethylene, propylene, 1-butene, 2-butene and isobutene, or copolymers or terpolymers thereof with other copolymerizable monomers, or compositions thereof. A good example is a method using in the form of a resin composition obtained by subjecting a product commercially available in the form of an olefin rubber latex to dehydrating treatment in an epoxy resin to disperse and stabilize the olefin rubber in the epoxy resin.
<Rubber-like Polymer Fine Particle of a Polyester Rubber Base>

The rubber-like polymer fine particle of a polyester rubber base is a fine particle comprising a rubber-like polymer having a polyester bond in a polymer skeleton and shall not specifically be restricted. Specific examples of the polyester rubber include, for example, low softening point polyester rubbers derived from at least one diol component selected from liquid polysiloxanediol, liquid polyolefindiol, polypropylene glycol and polybutylene glycol, if necessary, in the presence of triol or a polyhydric alcohol compound which has more hydroxyl groups than triol and at least one dibasic acid selected from adipic acid, maleic acid, succinic acid and phthalic acid, low softening point polyester rubbers prepared by substituting acid anhydrides for the dibasic acids described above or low softening point polyester rubbers derived from hydroxypolycarboxylic acids and the like.

<Rubber-like Polymer Fine Particle of a Urethane Rubber Base>

The rubber-like polymer fine particle of a urethane rubber base is a fine particle comprising a rubber-like polymer having a urethane bond and/or a urea bond in a rubber-like polymer skeleton and shall not specifically be restricted. Specific examples of the urethane rubber include, for example, rubber-like polyurethanes obtained by reacting at least one diol component selected from liquid polysiloxanediol, liquid polyolefiridiol, polypropylene glycol and polybutylene glycol, if necessary, in the presence of triol or a polyhydric alcohol compound which has more hydroxyl groups than triol with a diisocyanate compound represented by hexamethylenediisocyanate, isophoronediisocyanate, tolylenediisocyanate, diphenylmethanediisocyanate and norbornanediisocyanate, and rubber-like polyurethanes obtained by reacting at least one long chain diamine component selected from liquid polysiloxanediamine (the amino group-containing low molecular polysiloxane described above), liquid polyolefindiamine and polypropylene glycoldiamine, if necessary, in the presence of triamine or a polyamine compound which has more amino groups than triamine with a diisocyanate compound represented by hexamethylenediisocyanate, isophoronediisocyanate, tolylenediisocyanate, diphenylmethanediisocyanate and norbornanediisocyanate.

<Composite Rubber Particle>

Given as examples of the composite rubber are, for example, fine particles comprising graft polymers and/or block polymers or core/shell polymers and composite polymers each comprising two or more kinds of the acryl base, the silicone base, the conjugated diene base, the olefin base, the polyester base and the urethane base each described above.

<Rubber-like Polymer Having a Functional Group Reacting With an Epoxy Group>

Representative examples of the rubber-like polymer having a functional group reacting with an epoxy group include, for example, particles obtained by introducing functional groups reacting with an epoxy group into rubber like polymers of the acryl base, the silicone base, the conjugated diene base, the olefin base, the polyester base and the urethane base each described above.

The functional group reacting with an epoxy group includes, for example, a mercapto group, an amino group, an imino group, a carboxyl group, an acid anhydride group, an epoxy group and a hydroxyl group.

At least one of these functional groups is preferably introduced into the rubber-like polymer in a proportion of preferably 0.01 to 25 mass %, more preferably 0.1 to 10 mass %;

A method for introducing these functional groups shall not specifically be restricted and may be any one of an introducing methods comprising a random copolymerization method, an alternate copolymerization method, a condensation polymerization method, an addition polymerization method and a core-shell polymerization method in each of which a functional group-containing. monomer is polymerized with a monomer to constitute a main chain polymer, an ion adsorption-introducing method, a swelling impregnation-introducing method and a method for graft-polymerizing with a polymer forming a rubber-like polymer.

Among them, the copolymerizing method and the graft-polymerizing method are preferred since necessary functional groups can efficiently be introduced into the vicinity of a rubber-like polymer fine particle surface in the smaller amount.

In this rubber-like polymer having a functional group reacting with an epoxy group, a structure originating in a monomer having a functional group reacting with an epoxy group accounts preferably for 0.1 to 25 mass % in terms of a weight proportion based on the rubber-like polymer.

An adhesive property of the resulting liquid crystal sealant composition is notably improved by controlling the content of the repetitive structure originating in the monomer having a functional group reacting with an epoxy group to 0.1 mass % or more and 25 mass % or less. Accordingly, such content is preferred.

In the liquid crystal sealant composition of the present invention, the rubber-like polymer fine particle (2) preferably takes the form of a particle in the epoxy resin. A method for finding that the rubber-like polymer is present in the form of a particle in the epoxy resin shall not specifically be restricted, and being suitably employed are, for example, a method in which a mixture of the epoxy resin (1) having no turbidity and the rubber-like polymer fine particles (2) is prepared and the composition is observed under an optical microscope to confirm the presence of rubber-like polymer fine particles, a method in which a required amount of a polymercaptan base curing agent or a polyamine base curing agent each of which is used at room temperature is added to the composition to obtain a cured matter and a minute cutting plane thereof is sensitized by dyeing with osmic acid to be observed under a transmission electron microscope (TEM) or a scanning electron microscope (SEM) and a method for finding by measuring microscopic infrared absorption spectra of a micro layer of the cured matter (hereinafter referred to merely as microscopic IR measurement).

A method for judging that the rubber-like polymer fine particle (2) is present in the form of a fine particle in the liquid crystal sealant composition of the present invention shall not specifically be restricted, and being suitably employed are, for example, a method in which the thermally cured matter thereof is produced and then a minute cutting plane thereof is sensitized by dyeing with osmic acid to be observed under TEM or SEM, a method for judging by observing a broken section of the cured matter obtained in the same manner under SEM and comparing it with the image of element distribution analysis, a method in which a cured matter surface is subjected to etching after provided with selectivity by a known method and then observed under TEM or SEM, a method for judging by subjecting a micro layer of the cured matter to microscopic IR measurement and a method in which a micro layer of the cured matter is irradiated with a heat ray to judge kinds thereof from the generated gas components as well as particle diameters thereof.

Also, a method for determining a blending amount of the rubber-like polymer fine particles (2) contained in the liquid crystal sealant composition prepared shall not specifically be restricted, and allowed to be suitably employed are, for example, a method in which infrared absorption spectra (IR) of the liquid crystal sealant composition are taken to determine the amount from the calibration curves of the absorption spectra specific to a rubber-like polymer fine particle, a method in which the kind of the rubber-like polymer fine particle specified by IR analysis is identified to determine it from a value of an elastic modulus attenuation factor [G"] in a low temperature area by TBA measurement as an index for an effect which is definitely revealed depending on the kind of the rubber-like polymer fine particle, a thermal decomposition gas chromatography method, an elemental analysis method, a method in which a rubber-like polymer fine particle-occupying volume is determined from plural TEM or SEM photographs of the cured matter to calculate the amount by specific gravity reduction and a method for determining by analysis of thermally decomposed gas components.

The rubber-like polymer fine particles (2) may or may not be grafted in advance to the epoxy resin (1) in the liquid crystal sealant composition of the present invention.

(3) Inorganic Filler

The inorganic filler (3) used in the present invention may be any one as long as they can usually be used as an inorganic filler in the electronic material field.

To be specific, they include, for example, calcium carbonate, magnesium carbonate, barium sulfate, magnesium sulfate, aluminum silicate, zirconium silicate, iron oxide, titanium oxide, aluminum oxide (alumina), zinc oxide, silicon dioxide, potassium titanate, kaolin, talc, asbestos powder, quartz powder, mica and glass fiber.

A total content of alkali metals which is determined by an atomic absorption spectrometry of the inorganic filler decomposition products under a wet condition is controlled preferably to 50 ppm or less, more preferably 30 ppm or less and particularly preferably 15 ppm or less. This makes it possible to avoid a free ion from unnecessarily transferring to the liquid crystal phase at the time of bringing liquid crystal into contact with the cured matter of the crystal sealant composition of the present invention. A refining method for controlling the total content of alkali metals to 50 ppm or less shall not specifically be restricted, and the refining may be carried out by a known method such as an ion exchange method for an aqueous solution of the raw materials.

Also, the inorganic filler (3) has preferably a particle diameter falling in a range of 5 µm or less of a value at 99 mass % on a weight integration curve, which is determined by means of a laser particle size-measuring instrument using laser having a wavelength of 632.8 nm, and it has more preferably a weight average particle diameter falling in a range of 0.005 to 1 µm, which is shown by a value at 50 mass % on the weight integration curve.

In general, use of the inorganic filler having a particle diameter of 5 µm or less of a value at 99 mass % on the weight integration curve elevates further more dimensional stability of a gap width in the liquid crystal panel and therefore is preferred.

In the liquid crystal sealant composition of the present invention, a content of the inorganic filler (3) is 5 to 50 mass %. It falls more preferably in a range of 5 to 30 mass %, particularly preferably 5 to 15 mass %. The content controlled to 5 mass % or more makes it possible to maintain a coated form-holding property in screen printing or dispenser coating. On the other hand, the content controlled to 50 mass % or less makes it possible to optimize a viscosity of the liquid crystal sealant composition and secure the coating workability.

The inorganic filler (3), though not specifically restricted, is preferably used after modified in advance by grafting with an epoxy resin (1) and a silane coupling agent (6).

In modification by grafting, a part or the whole of the inorganic filler (3) may be modified by grafting. In this case, the grafting rate is shown by a mass increasing rate determined by a repetitive solvent-washing method, and usually either or both of the epoxy resin (1) and the silane coupling agent (6) of 1 to 50 mass parts per 100 mass parts of the inorganic filler (3) are preferably chemically bonded.

A method for measuring the content of the inorganic filler (3) contained in the liquid crystal sealant composition shall not specifically be restricted and may be an optional method such as a method for determining by elemental analysis, a method for determining by fluorescent X-ray analysis and a method for determining by a heat decomposition residual amount.

(4) Thermally Active Potential Curing Agent for Epoxy Resin:

A compound which can allow an epoxy resin to cause a curing reaction by heating at 50° C. or higher can be selected and used as the thermally active potential curing agent for epoxy resin (4) used in the present invention.

The composed shall not specifically be restricted and includes, for example, dicyandiamides and derivatives thereof, dihydrazide compounds such as adipic acid dihydrazide and isophthalic acid dihydrazide, 4,4'-diaminodiphenylsulfone, imidazole derivatives such as 2-n-pentadecylimidazole, complexes of imidazole compounds represented by 2-methylimidazole and 2-ethyl-4-methylimidazole and aromatic acid anhydrides, adducts of imidazole compounds and epoxy resins and modified derivatives thereof, adducts of urea and/or thiourea compound and epoxy resins or diisocyanate compounds, boron trifluoride-amine complexes, vinyl ether-blocked carboxylic acid compounds, aromatic allyl ether compounds represented by allyl ether compounds of 1,6-dinaphthol, N,N-dialkylurea derivatives, N,N-dialkylthiourea derivatives, melamine and guanamine.

The thermally active potential curing agent for epoxy resin (4) accounts for 5 to 30 mass % in terms of a proportion based on the liquid crystal sealant composition of the present invention. The proportion controlled to 5 mass % or more can control curing of the liquid crystal sealant composition of the present invention within required time. On the other hand, the proportion controlled to 30 mass % or less can reduce the presence of the unreacted curing agent to a lower level.

A method for determining a content of the thermally active potential curing agent for epoxy resin in the liquid crystal sealant composition includes preferably a method in which it is determined from infrared spectra, a method in which it is determined by analysis of a functional group and a method of NMR analysis for a solid.

(5) High Softening Point-polymer Fine Particle Having a Softening Point of 50° C. or Higher and a Primary Particle Diameter of 2 µm or Less (Hereinafter Referred to Merely as a High Softening Point-polymer Fine Particle)

In the liquid crystal sealant composition of the present invention, the high softening point-polymer fine particle (5) is added in a range of 0.1 to 9.5 mass % in terms of a proportion based on the composition. Use of 0.1 mass % or more makes it possible to elevate the seal adhesion characteristic in which seal leak and bleeding are not caused at a primary bonding step by a single layer hot press and therefore is preferred. On the other hand, use of 9.5 mass % or less makes it possible to sufficiently secure the gap-forming workability and therefore is preferred.

The high softening point-polymer fine particle (5) is the high softening point-polymer fine particle (5) (hereinafter referred to merely as the high softening point-polymer fine particle) having a softening point of 50° C. or higher in terms of a softening point determined by TBA and an average particle diameter of a primary particle of 2 μm or less determined by observation under an electron microscope.

The gap-forming workability can be secured by controlling the average particle diameter of the primary particle of the high softening point-polymer fine particle (5) to 2 μm or less. The average particle diameter of the primary particle falls more preferably in a range of 0.01 to 1 μm, further more preferably 0.2 to 0.5 μm.

The high softening point-polymer fine particle (5) of either a cross-linking type or a non-cross-linking type can be used, and the cross-linking type is more preferred. In particular, the high softening point-polymer micro particle having a micro cross-linking structure is most preferred.

The high softening point-polymer fine particle having a micro cross-linking structure can be produced by controlling a cross-linkable monomer to a range of 0.1 to 50 mass %, preferably 1 to 10 mass % and most preferably 1 to 3 mass % based on the whole monomers for producing the polymer.

A gel content is one of indices for a degree of the micro cross-linking. This is an index determined from the following equation, wherein 10 g of the high softening point-polymer fine particle is dispersed in 50 g of a methylcarbitol solvent and stirred for one hour at 25° C., and then it is filtered to determine a quantity of filtrate and a polymer content (dissolved amount) in the filtrate:

gel content (%)=(dissolved amount/10 g)×100

This gel content index falls preferably in a range of 0 to 50%, more preferably 0 to 5%.

The high softening point-polymer fine particle falls preferably in a range of 9 to 11, more preferably 9.3 to 10.5 in terms of an SP value (solubility parameter) which is an index for showing an affinity calculated from a chemical structural formula.

Given as specific examples of the high softening point-polymer fine particle (5) are, for example, polymers having micro cross-linking polymethyl methacrylate as the main component which is obtained by copolymerizing 0.1 to 50 mass % of cross-linkable monomers and polymethyl methacrylate polymers having an monomer structure falling in a range of 0.1 to 50, mass %. The high softening point-polymer fine particle (5) has preferably a softening point of 60 to 150° C. and a primary particle diameter falling in a range of 0.01 to 3 μm.

In this high softening point-polymer fine particle, one kind of a functional group such as an epoxy group, an amino group, an imino group, a mercapto group and a carboxyl group is more preferably introduced into a particle surface thereof.

In the liquid crystal sealant composition of the present invention, the rubber-like polymer fine particle (2) and the high softening point-polymer fine particle (5) may be combined in advance, and included is, for example, an embodiment in which the rubber-like polymer fine particle (2) described above forms a core phase and the high softening point-polymer fine particle (5) forms a shell phase, a so-called core/shell type composite fine particle of (2) and (5) (A). Also, in contrast with this, allowed to be used is a core/shell type composite fine particle (B) in which the high softening point-polymer fine particle (5) forms a core phase and the rubber-like polymer fine particle (2) forms a shell phase. When used in a combined form, the former core/shell type composite fine particle (A) is preferably used.

In the core/shell type composite fine particle (A) containing the rubber-like polymer fine particle (2) as the core phase, a mass ratio of core:shell falls preferably in a range of (1:0.3) to (1:2). For example, a brand name [Zeon F-351], a product manufactured by Nippon Zeon Co., Ltd. can readily be available as a specific example of the core/shell type high softening point-polymer fine particle (A) and can preferably be used.

A method for determining a proportion of the high softening point-polymer fine particle (5) contained in the liquid crystal sealant composition shall not specifically be restricted and includes, for example, a thermal decomposition gas chromatography method and a nuclear magnetic resonance spectrum (NMR) method.

In the liquid crystal sealant composition of the present invention, allowed to be added are 0.1 to 5 mass parts of the silane coupling agent (6) and 0.1 to 10 mass parts of the curing accelerator (7) per 100 mass parts of the composition comprising the components (1) to (5). The silane coupling agent (6) and the curing accelerator (7) which can be used in this case shall be described below in detail.

(6) Silane Coupling Agent

The silane coupling agent (6) shall not specifically be restricted,h and any one can be used. Trialkoxysilane compounds and methyldialkoxysilane compounds can be given as preferred examples thereof. Given-as specific examples thereof are γ-glycidoxypropylmethyldimethoxysilane, γ-glycidoxy-propyltrimethoxysilane, γ-glycidoxypropylmethyldiethoxy-silane, γ-glycidoxypropyltriethoxysilane, γ-aminopropyl-methyldimethoxysilane, γ-aminopropyltrimethoxysilane, γ-aminopropylmethyldiethoxysilane γ-aminopropyltriethoxysilane, N-aminoethyl-γ-aminopropylmethyldimethoxysilane, N-aminoethyl-γ-aminopropyltrimethoxysilane, N-aminoethyl-γ-aminopropyltriethoxysilane , N-phenyl-γ-aminopropyltrimethoxysilane, N-phenyl-γ-aminopropyltriethoxysilane, N-phenyl-γ-aminopropylmethyldimethoxysilane, N-phenyl-γ-aminopropylmethyldiethoxysilane, γ-mercaptopropylmethyldimethoxysilane, γ-mercaptopropyltriethoxysilane, γ-mercaptopropylmethyldiethoxysilane γ-mercaptopropyltrimethoxysilane, γ-isocyanatopropylmethyl-diethoxysilane and γ-isocyanatopropyltriethoxysilane. Among them, glycidylsilane is particularly preferred.

The silane coupling agent (6) is used preferably in a proportion falling in the range described above, and use of 0.1 mass % or more based on the composition comprising the components (1) to (5) can expect the adhesive property to a glass substrate to be improved. On the other hand, the use in the proportion controlled to 5 mass % or less makes it possible to secure a balance between the non-bleeding property and the adhesion reliability and therefore is preferred. It is used more preferably in a proportion of 0.5 to 3 mass %.

A method for determining a proportion of the silane coupling agent (6) contained in the liquid crystal sealant composition shall not specifically be restricted and includes, for example, a thermal decomposition gas chromatography method, a nuclear magnetic resonance spectrum (NMR) method and a method in which a gas volume generated by hydrolysis is determined.

(7) Curing Accelerator

The curing accelerator (7) which can be used in combination, if necessary, for the liquid crystal sealant composition of the present invention includes, for example, 1,1-dialkylurea derivatives, imidazole derivatives or salts thereof, adducts of polyamine compounds and epoxy resins or salts thereof, adducts of amine compounds and diisocyanate compounds or salts thereof, adducts of amine compounds and diisocyanate compounds or modified derivatives thereof, trisdimethylaminomethylphenol or salts thereof, 1,8-diazabicyclo (5,4,0)-undecene-7 and salts thereof, 1,5-diazabicyclo (4,3,0)-nonene-5 and salts thereof, 6-dibutylamino-1,8-diazabicyclo (5,4,0)-undecene-7 and salts thereof and triphenylphosphine.

The curing accelerator (7) accounts preferably for 0.1 to 10 mass % based on the composition. If it accounts for 0.1 mass % or more, a curing activity of the potential curing agent for epoxy resin (4) can sufficiently be derived in hot curing. On the other hand, if it is used in a proportion of 10 mass % or less, storage stability of the resulting liquid crystal sealant composition at 25° C. can be raised.

Among them, those having low activity at a low temperature and high storage stability are preferred, and from this point of view, 1,1-dialkylurea derivatives are preferred.

The sum of the contents of alkali metals determined by an atomic absorption spectrometry of the curing accelerator decomposition products under a wet condition is controlled preferably to 50 ppm or less, more ipreferably 30 ppm or less and particularly preferably to 15 ppm or less. This makes it possible to avoid a free ion from substantially transferring to the liquid crystal phase at the time of bringing liquid crystal into contact with the cured matter of the liquid crystal sealant composition of the present invention. A refining method for controlling the total content of alkali metals to 50 ppm or less shall not specifically be restricted and the refining may be carried out by a known method such as a solvent-extracting refining method.

(1,1-Dialkylurea Derivatives)

Representative examples thereof are, for example, 3-(p-chlorophenyl)-1,1-dimethylurea, 3-(o,p-dichlorophenyl)-1,1-dimethylurea, 2,4-[bis(1,1-dimethylurea)]toluene and 2,6-[bis(1,1-dimethylurea)]toluene.

(Imidazole Derivatives or Salts Thereof)

The imidazole derivatives include, for example, 2-methylisocyanuric acid adducts, 2-n-pentadecylimidazole, N-cyanoethyl-2-ethyl-4-methylimidazole and adducts of imidazole compound and epoxy resins, and they can be used alone or in combination of two or more kinds thereof.

The adducts of imidazole compounds and epoxy resins mean adducts of imidazole compounds having active. hydrogen groups and epoxy resins.

Given as specific examples of the adducts of imidazole compounds and epoxy resins are, for example, adducts having a softening point of 70 to 150° C., which comprises reaction products obtained by reacting epoxy resins with imidazole compounds and then further reacting with such amount of phenol novolak resins as does not exceed twice as much as a mass of the epoxy resins and in which a ratio of an epoxy group equivalent in the epoxy resin to a molecular equivalent of the imidazole compound falls in a range of (0.8:1) to (2.2:1). Another preferred specific example includes an adduct obtained by reacting an epoxy resin with an imidazole compound and then further reacting with a hydroxystyrene resin. Further, given as the example thereof is an adduct of an epoxy resin, a compound having a nitrogen-base group having no primary amino group in a molecule (including an imidazole compound) and a phenol-formaldehyde resin having a mass average molecular weight of 2000 to 10000 reduced to polystyrene determined by GPC.

Those having a melting point of 70 to 150° C. are particularly preferably selected and used as the adducts of imidazole compounds and epoxy resins.

(Adducts of Polyamine Compounds and Epoxy Resins)

The adducts of polyamine compounds and epoxy resins shall not specifically be restricted and are represented by adducts derived from known polyamine compounds and epoxy resins.

More specific examples thereof include, for example, adducts obtained by reacting addition reaction products of epoxy resins and polyamines with compounds having two or more acidic hydroxyl groups. The compounds having two or more acidic hydroxyl groups includes phenol resins, modified phenol resins and polycarboxylic acids.

(Adducts of Amine Compounds and Diisocyanate Compounds or Modified Derivatives Thereof)

The adducts of amine compounds and diisocyanate compounds are represented by substances obtained by reacting known primary or secondary amine compounds with diisocyanates. Substances obtained by reacting N,N-dialkylaminoalkylamines and cyclic amines with diisocyanates with heating can be given as examples of the modified derivatives of the adducts of amine compounds and diisocyanate compounds. Further, given as the examples thereof are compositions obtained by bringing diisocyanate compounds into even contact with a particle surface of a powdery substance having a softening point of 60° C. or higher and a tertiary amino group.

(Trisdimethylaminomethylphenol Salts)

The trisdimethylaminomethylphenol salts include, for example, trisdimethylaminomethylphenol octylic acid salts, trisdimethylaminomethylphenol oleic acid salts and trisdimethylaminomethylphenol formic acid salts.

(1,8-Diazabicyclo (5,4,0)-undecene-7 Salts)

Representative examples of the 1,8-diazabicyclo (5,4,0)-undecene-7 salts (hereinafter referred to merely as DBU salt) include, for example, DBU phenol salt, DBU polyphenol compound salt, DBU polyphenol salt, DBU octylic acid salt, DBU oleic acid salt and DBU formic acid salt.

(1,5-Diazabicyclo (4,3,0)-nonene-5 Salts)

Representative examples of the 1,5-diazabicyclo (4,3,0)-nonene-5 salts (hereinafter referred to merely as DBN salt) include, for example, DBN phenol salt, DBN polyphenol compound salt, DBN polyphenol salt, DBN octylic acid salt, DBN oleic acid salt, DBN formic acid salt and DBN paratoluenesulfonic acid salt.

(6-Dibutylamino-1,8-diazabicyclo (5,4,0)-undecene-7 Salts)

Representative examples of the 6-dibutylamino-1,8-diazabicyclo (5,4,0)-undecene-7 salts (hereinafter referred to merely as DB salt) include, for example, DB phenol salt, DB polyphenol compound salt, DB polyphenol salt, DB octylic acid salt, DB oleic acid salt, DB formic acid salt and DB paratoluenesulfonic acid salt.

In the liquid crystal sealant composition of the present invention, the particularly preferred example of the curing accelerator (7) is one selected from 3-(p-chlorophenyl)-1,1-dimethylurea, 3-(o,p-dichlorophenyl)-1,1-dimethylurea, 2,4-[bis(1,1-dimethylurea)]toluene and 2,6-[bis(1,1-dimethylurea)]toluene.

(8) Solvent

In the liquid crystal sealant composition of the present invention, 1 to 25 mass % of the solvent (8) which is compatible with an epoxy resin and has a boiling point falling in a range of 150 to 230° C. and which is inactive to an epoxy group may be used, if necessary, in any one of the compositions comprising either the component (1) to (5) or (1) to (7). Use of 1 mass % or more thereof elevates the wettability to an adherend and therefore is preferred. On the other hand, use of 25 mass % or less makes it possible to secure the coating workability and therefore is preferred.

The solvent (8) is preferably selected from high boiling solvents having a boiling point falling in a range of 150 to 230° C., preferably 160 to 200° C.

It shall not specifically be restricted, and specific examples of the preferred solvent (8) include, for example, ketone solvents such as cyclohexanone, ether solvents and acetate solvents.

More specific examples of the ether solvents include ethylene glycol monomethyl ether, ethylene glycol monoethyl ether, ethylene glycol monopropyl ether, ethylene glycol monobutyl ether, ethylene glycol monophenyl ether, ethylene glycol dimethyl ether, ethylene glycol diethyl ether, ethylene glycol dipropyl ether, ethylene glycol dibutyl ether, ethylene glycol diphenyl ether, diethylene glycol monomethyl ether, diethylene glycol monoethyl ether, diethylene glycol monopropyl ether, diethylene glycol monobutyl ether, diethylene glycol monophenyl ether, diethylene glycol dimethyl ether, diethylene glycol diethyl ether, diethylene glycol dipropyl ether, diethylene glycol dibutyl ether and diethylene glycol diphenyl ether.

The acetate solvents are represented, for example, by ethylene glycol monoacetate, ethylene glycol monomethyl ether acetate, ethylene glycol monoethyl ether acetate, ethylene glycol monopropyl ether acetate, ethylene glycol monobutyl ether acetate, ethylene glycol monophenyl ether acetate, ethylene glycol diacetate, diethylene glycol monomethyl acetate, diethylene glycol monoethyl acetate, diethylene monobutyl ether acetate and diethylene glycol diacetate.

The particularly preferred solvent (8) is at least one selected from ethylene glycol monobutyl ether, ethylene glycol monomethyl ether acetate, diethylene glycol dimethyl ether, propylene glycol monomethyl ether, propylene glycol monomethyl ether acetate, propylene glycol monoethyl ether acetate and propylene glycol diacetate.

(9) Gap-forming Controller

The gap-forming controller (9) means a substance which can control optionally and accurately a gap width of a liquid crystal display element to a prescribed width of, for example, 3 to 7 μm. It doesn't matter whether the substance is organic or inorganic.

The gap-forming controller (9) is suitably added, if necessary, preferably in a proportion of 0.1 to 5 mass %, more preferably 0.5 to 2.5 mass based on the composition for a liquid crystal display cell sealant of the present invention.

The gap-forming controller (9) includes, for example, vertically and horizontally symmetric inorganic particles or thermosetting polymer particles such as spherical or rugby ball-like particles and cylindrical fibers which are not deformed, dissolved or swollen by the epoxy resin (1) or the solvent (8) that is added if necessary.

Examples of the inorganic particles in the gap-forming controller include spherical silica particles, spherical alumina particles, glass short fibers, metal short fibers and metal powders.

The organic gap-forming controller includes thermosetting polystyrene spherical particles, other phenol resin base thermosetting particles and benzoguanamine resin base thermosetting particles.

The inorganic particles are particularly preferred since they can control the gap accuracy at a high accuracy.

(10) Other Additives

A leveling agent, a pigment, a dye, a plasticizer and a defoaming agent can further be used, if necessary.

Production Process for Liquid Crystal Sealant Composition:

The liquid crystal sealant composition of the present invention can be prepared by suitably adding and mixing the epoxy resin (1) having 1.2 or more epoxy groups on an average in a molecule, the rubber-like polymer fine particle (2) having a softening point of 0° C. or lower and a primary particle diameter of 5 μm or less, the inorganic filler (3), the potential curing agent for epoxy resin (4), the high softening point-polymer fine particle (5) having a softening point of 50° C. or higher and a primary particle diameter of 2 μm, and if necessary, the silane coupling agent (6), the curing accelerator (7), the solvent (8), the gap-forming controller (9) and other additives, and the method shall not specifically be restricted.

They may be mixed by means of a known kneading machine such as a double arm stirrer, a roll mixer, a twin screw extruder and a ball mill, and the composition is subjected to vacuum degassing treatment, finally charged into a glass bottle or a plastic vessel and tightly sealed, stored and transported.

Physical Properties of the Liquid Crystal Sealant Composition:

The viscosity of the liquid crystal sealant composition before curing shall not specifically be restricted, and the viscosity at 25° C. determined by an E type viscometer falls preferably in a range of 1 to 1000 Pa·s, more preferably 5 to 500 Pa·s and most preferably 10 to 200 Pa·s. The liquid crystal sealant composition of the present invention is controlled in advance to a viscosity of this range by heating and aging and then produced.

The thixotropic index represented by, for example, a ratio of a viscosity value at 0.5 rpm to a viscosity value at 5 rpm (viscosity value at 0.5 rpm/viscosity value at 5 rpm), which are obtained by using the same rotor number of an E type viscometer, tough not specifically restricted, falls preferably in a range of 1 to 10.

Production Process for Liquid Crystal Display Cell:

A production process for the liquid crystal display cell of the present invention, comprising:

printing or dispenser-coating the liquid crystal sealant composition of the present invention on a bonding-sealing part of a glass-made or plastic-made substrate for a liquid crystal cell and precuring it at 80 to 100° C., adjusting the position in a pair with a substrate which is not subjected to the treatment described above, and then subjecting the paired substrates to hot press treatment at 100 to 200° C. to bond and fix the above paired substrates in a homogeneous thickness falling in a prescribed range of, for example, 3 to 7 μm.

In this case, precuring is required in advance in order to completely cure the liquid crystal sealant composition containing a solvent, bond and seal it. The precuring conditions shall not specifically be restricted. A heating and drying temperature at which the solvent contained can preferably be removed by at least 95 mass %, and which is not higher than a thermally active temperature of the potential curing agent for epoxy resin contained is preferably selected.

General precuring conditions are a temperature falling in a range of 80 to 100° C. and a drying time falling in a range of 5 to 60 minutes. The drying time is preferably shortened as the temperature is elevated. The solvent can be removed even in precuring at a temperature exceeding 100° C., but an accuracy in the gap width tends to be reduced by progress in the curing reaction, and therefore attentions have to be paid.

The substrate used for the liquid crystal cell includes, for example, a glass substrate and a plastic substrate. It is A matter of course in the preceding substrates that used is a so-called liquid crystal cell-constituting glass substrate or plastic substrate in which provided on needed parts are a transparent electrode represented by indium oxide, an alignment film represented by polyimide and in addition thereto, an inorganic ion-shielding film and the like.

A method of coating the liquid crystal sealant composition on a substrate shall not specifically be restricted and includes, for example, a screen printing coating method and a dispenser coating method. After coating, predrying is carried out, if necessary, and then bonding is carried out by superimposing and hot press bonding. In this case, hot curing conditions shall not specifically be restricted and are 100 to 200° C. for 24 to 0.5 hours.

In carrying out a hot press step by means of a single layer hot press, a condition under which a temporary adhesive property can be secured shall not specifically be restricted. Preferably, after bonded at 110 to 200° C. for 2 to 10 minutes, the pressure is reduced to take out the substrate, and subsequently it is completely cured in a heated oven controlled to the same temperature, whereby bonding is carried out through two-stage or plural heating steps and aging steps.

In this case, the single layer hot press means a hot press machine having a specification to carry out bonding set by set. Known are a vacuum single layer hot press which is a single layer hot press apparatus capable of heating under vacuum and a normal single layer hot press of a type in which hot press bonding is forcibly carried out via a hot plate under atmospheric pressure. It may be either single layer hot press system.

Also, it causes no any problems to carry out the hot press bonding described above by a multistage hot press separately from the single layer hot press.

Liquid Crystal Display Element:

The liquid crystal display element of the present invention is a liquid crystal display element obtained by:

printing or dispenser-coating the liquid crystal sealant composition of the present invention on a bonding-sealing part of a glass-made or plastic-made substrate for a liquid crystal cell and precuring it at 70 to 120° C., then adjusting the position in a pair with a substrate which is not subjected to the treatment described above, subjecting the paired substrates to hot press treatment at 100 to 200° C. to bond and fix in a homogeneous thickness falling in a prescribed range of, for example, 3 to 7 $\mu$m to obtain a cell, and then charging a liquid crystal material into the above cell and sealing the injection port with a two-liquid type liquid crystal sealant composition.

The above two-liquid type liquid crystal sealant composition shall not specifically be restricted, and any one can be used as long as the effects of the present invention are not damaged. Given as examples thereof are, for example, a two-liquid type liquid crystal sealant composition comprising an epoxy resin and a polyamide curing agent, a two-liquid type liquid crystal sealant composition comprising an epoxy resin and a polythiol curing agent and a two-liquid type liquid crystal sealant composition comprising an epoxy resin and a polyamine curing agent.

The liquid crystal material shall not be restricted, and nematic liquid crystal and ferroelectric liquid crystal are suited.

Preferred examples of the liquid crystal display element used in the present invention include, for example, a TN type (twisted nematic) liquid crystal element and an STN type (super twisted nematic) liquid crystal element which are proposed by M. Schadt and W. Helfrich, a ferroelectric type liquid crystal element proposed by N. A. Clark and S. T. Lagerwall and a liquid display crystal element provided on each pixel with a thin film transistor.

EXAMPLES

The present invention shall be explained below in details with reference to representative examples, but the present invention shall not be restricted thereto. Percentage and part in the examples mean mass % and mass part (weight part) respectively.

The kinds (abbreviation codes) of raw materials used in the examples are as follows.

Test Methods (Storage Stability Test)

A polyethylene-made vessel is charged with 100 parts of the liquid crystal sealant composition and tightly sealed. Then, the viscosity value after 30 days passed at −10° C. is shown by a change rate, wherein the viscosity value at 20° C. at the time of sealing is set at 100:

○: change rate is less than 10%, and storage stability is good

Δ: change rate is 11 to 50%, and a little problem is present in storage stability X: change rate exceeds 50%, and storage stability is inferior (Coating Workability Test)

The liquid crystal sealant composition stored in a sealed polyethylene-made vessel at the freezing point or lower is taken out and turned to 25° C. of room temperature in 2 hours. The viscosity value at 25° C. at that time is set at 100, and the viscosity value after left standing at 25° C. for 12 hours is shown by a change rate:

○: change rate is less than 15%, and coating workability is good

Δ: change rate is 16 to 50%, coating workability is a little inferior

X: change rate exceeds 50%, and coating workability aptitude is markedly inferior (Viscosity Characteristic of B Stage-reduced Composition at 80 to 120° C. by an E Type Viscometer)

The liquid crystal sealant compositions prepared in the respective examples are coated on a smooth release film in a thickness of 10 to 50 $\mu$m, and 0.6 part of B stage-reduced compositions obtained under the B stage-reduced conditions in the respective examples is quickly sampled. The temperature is elevated from 40° C. at a constant rate of 1° C./2 minutes in determing by means of an E type viscometer to obtain a viscosity curve of up to 120° C. ((temperature)-(rotational viscosity at 0.5 rpm)). The viscosity at viscosity at 80 to 100° C. is determined from the above temperature-viscosity curve:

X (−): viscosity is less than 50 Pa·s

Δ: 50 to 100 Pa·s

○: 101 to 500 Pa·s

◎: 501 to 10000 Pa·s

X (+): exceeding 10000 Pa·s (Moisture Permeability Characteristic)

The liquid crystal sealant compositions prepared in the respective examples are coated on a smooth release film in a thickness of 70 to 120 µm and subjected to heat treatment at 80° C. for 20 minutes, and then it is further subjected to hot curing at 150° C. for 90 minutes to obtain a cured film. The cured film is cut out and subjected to a moisture permeability test according to a moisture permeability test method (cup method) JIS-Z-02008 of a damp proofing material in Japan Industrial Standard (JIS) to determine the amount of moisture (unit: $g/M^2 \cdot 24$ hours) per 100µ of the film thickness which permeates at 80° C. in 24 hours:

○: moisture permeability characteristic is less than 200 $g/m^2 \cdot 24$ hours, and the liquid crystal sealant composition is excellent in a low moisture permeability X: moisture permeability characteristic exceeds 351 $g/m^2 \cdot 24$ hours, and the liquid crystal sealant composition is lacking in a low moisture permeability Δ: moisture permeability characteristic is 201 to 350 $g/m^2 \cdot 24$ hours (Linear Expansion Coefficient of Cured Matter)

The liquid crystal sealant compositions prepared in the respective examples are coated on a smooth release film in a thickness of 70 to 120 µm and subjected to heat treatment at 80° C. for 20 minutes, and then it Is further subjected to hot curing at 150° C. for 90 minutes to obtain a cured film. A small piece (15 mm square) thereof is cut out and subjected to ATM measurement by elevating the temperature from 0 up to 180° C. at a constant rate of 5° C./minute. The distortion observed from 0° C. up to 80° C. is divided by 80 to determine a linear expansion coefficient per 1° C.

(Glass Transition Temperature Tg of Cured Matter)

The liquid crystal sealant compositions prepared in the respective examples are coated on a smooth release film in a thickness of 70 to 120 µm and subjected to heat treatment at 80° C. for 20 minutes, and then it is further subjected to hot curing at 150° C. for 90 minutes to obtain a cured film. A small piece (15 mm square) thereof is cut out and subjected to TMA measurement by elevating the temperature from 40 up to 180° C. at a constant rate of 5° C./minute. The inflection point of distortion is set as a glass transition temperature (Tg) of the cured matter.

(Water Absorption Coefficient of Cured Matter)

The liquid crystal sealant compositions prepared in the respective examples are coated on a smooth release film in a thickness of 70 to 120 µm and subjected to heat treatment at 80° C. for 20 minutes, and then it is further subjected to hot curing at 150° C. for 90 minutes to obtain a cured film. The cured film is cut out to a 100 mm square and dipped in boiling water for 3 hours. Then, an increment in the mass is measured to obtain the water absorption coefficient which is determined by dividing the increment by the original mass to obtain a value and multiplying it by 100. That is, it is shown by:

water absorption coefficient (%)=(increment in the mass after dipping in boiling water)/mass before test)×100

(Free Ion Concentration)

Measured is an ionic conductivity of compositions prepared by stirring 100 mass parts of the liquid crystal sealant compositions prepared in the respective examples with the same mass of purified water at room temperature for 10 minutes:

⊚: conductivity is 2 mS/m or less

Δ: conductivity is 2.1 to 9.9 mS/m

X: conductivity is 10 mS/m or more (Bonding-sealing Test)

The cell for liquid crystal display produced via the single layer press curing step under the conditions shown in the respective examples are expanded under a magnifying glass of 20 magnifications and observed with eyes to determine the presence of disturbance in the seal lines and inferior spots in sealing brought about by seal leak generated.

(Heat Resistant Peeling Test of Cell by Wedge)

A wedge is driven under 60° C. environment into the cell for liquid crystal display produced via the single layer press curing step under the conditions shown in the respective examples, and an adhesive force of the liquid crystal sealant composition is shown by a peeling state thereof:

⊚: substrate is broken or cohesive failure of the liquid crystal sealant composition is observed, and heat resistant adhesive property is excellent ○: interfacial rupture in which cohesive failure of the liquid crystal sealant composition is partly observed, and heat resistant adhesive property is good X: breakage having interfacial peeling is observed, and heat resistant adhesive property is problematic (Non-bleeding Property of the Liquid Crystal Sealant Composition)

A liquid crystal material, RC4087 (manufactured by Chisso Corporation) in which liquid crystal has a threshold voltage of 1.38 V and a Δε of 12.4 is charged into the cell for liquid crystal display produced via the single layer press curing step under the conditions shown in the respective examples from a liquid crystal injection port by a vacuum method, and then the injection port is sealed by Structbond ES-302 (manufactured by Mitsui Chemicals Inc.). A polarizing plate is stuck on the front side, and a polarizing plate provided with a reflecting plate is disposed on the rear side. Then, a driving circuit and the like are mounted on the above unit to prepare a liquid crystal panel. It is observed whether or not a liquid crystal display function in the vicinity of the sealing material in the liquid crystal panel functions normally from the beginning to evaluate and judge the non-bleeding property. Evaluation in the above judging method is shown by the following symbols:

○: liquid crystal display function can be exhibited to sealed edge, and non-bleeding property is secured Δ: normal liquid crystal display is not exhibited within 1 mm in the vicinity of sealed edge and non-bleeding property is a little inferior X: abnormal liquid crystal display is exhibited exceeding 1.1 mm in the vicinity of sealed edge, and non-bleeding property is markedly inferior (Sealing Function Durability Test)

RC4087 (manufactured by Chisso Corporation) is charged into the cell for liquid crystal display produced via the single layer press curing step under the conditions shown in the respective examples from a liquid crystal injection port, and then the injection port is sealed by Structbond ES-302 (manufactured by Mitsui Chemicals Inc.) to prepare a liquid crystal panel. The liquid crystal panel is taken out after left standing for 250 hours and 500 hours respectively under an environment of 65° C./RH 95%. A polarizing plate is stuck on the front side, and a polarizing plate provided with a reflecting plate is disposed on the rear side. Then, a driving circuit and the like are mounted on the above unit to observe a change in the display function:

⊚: uneven display is not observed

○: uneven display is slightly observed within 500 µm in terms of a distance from sealed edge of cell circumferential part X: uneven display is extended to 500 μm or more in sealed edge, and a marked reduction in display function is caused Raw Materials Used

1. Epoxy Resin (1)

Prepared as monofunctional epoxy resins were 2-ethylhexyl monoglycidyl ether (abbreviation code: 2EHG) so refined that an ionic conductivity of extract water is 0.015 ms/m (hereinafter referred to merely as an ionic conductivity of extract water), wherein 2 EHG is subjected to extraction by bringing into contact with the same mass of purified water for one hour and t-butylphenol monoglycidyl ether (abbreviation code: t-BPMG) refined to 0.012 mS/m in terms of an ionic conductivity of extract water.

The following ones were used as polyepoxy resins having di-functionality or higher.

1,6-Hexanediol diglycidyl ether refined to 0.02 mS/m in terms of an ionic conductivity of extract water was used as a difunctional-aliphatic epoxy resin; used as difunctional bisphenol A type epoxy resins were a brand name [EPOMIK R-140P] (average molecular weight: 370), a product manufactured by Mitsui Chemicals Inc. and a brand name [Epikoto 1007] (average molecular weight: 4000), a product manufactured by Yuka Shell Co., Ltd.; used as a difunctional bisphenol F type epoxy resin was a brand name [Epiclon 830-S] (average molecular weight: about 350 to 370), a product manufactured by Dainippon Ink and Chemicals Inc.; and used as difunctional hydrogenated bisphenol A type epoxy resin was a brand name [Epotote ST-1000] (average molecular weight: 400 to 440), a product manufactured by Toto Kasei Co., Ltd.

Used as a trifunctional novolak epoxy resin was a brand name [Epotote YDCN] (polystyrene-reduced mass average molecular weight determined by GPC: about 1000), a product manufactured by Toto Kasel Co., Ltd., and used as a tetrafunctional aminoepoxy resin was a brand name [Epotote YH-434] (polystyrene-reduced mass average molecular weight determined by GPC: about 460), a product manufactured by Toto Kasei Co., Ltd.

Modified epoxy resins shall be explained in the examples.

2. Inorganic Filler (3)

Used respectively were as an amorphous type silica-1 (abbreviated name), a brand name [Aerosil #200] (average primary particle size determined by observation under an electron microscope: 0.08 μm), a product manufactured by Nippon Aerosil Ind. Co., Ltd.; as an amorphous type silica-2 (abbreviated name), a brand name [FMU-120] (average primary particle size determined by observation under an electron microscope: 0.07 μm), a product manufactured by Shin-Etsu Chemical Co., Ltd.; as an amorphous type alumina (abbreviated name), a brand name [FUA-5105], a product manufactured by Showa Denko K. K.; and as titanium oxide, a brand name [CR-EL] (average particle size: 1 μm in terms of an average size which is an average primary particle size shown by a particle diameter at 50% of a weight integration curve determined by a laser irradiation type particle size distribution-measuring method using laser having a wavelength of 632.8 nm), a product manufactured by Ishiwara Sangyo Kaisha.

Also, the following one was used as grafted modified alumina-1.

Prepared for grafted modified alumina-1 was γ-alumina of an amorphous type having an average particle diameter of 0.1 μm which is a value at 50% of a weight integration curve determined by a laser irradiation type particle size distribution-measuring method using laser having a wavelength of 632.8 nm and an average particle diameter of 2 μm which is a value at 99.5% of the weight integration curve. The amorphous γ-alumina of 1 kg was subjected to spraying treatment with 30.3 g of γ-glycidoxypropyltrtimethoxysilane (brand name KBM403, a product manufactured by Shin-Etsu Silicone Co., Ltd.) under an environment of 100° C., and it was further grafted and ripened at 80° C. for 48 hours. A sample dried after washing 5 times 10 parts of grafted modified alumina-1 with 100 parts of a toluene solvent was burned in a porcelain crucible to find that there was a mass-loss of 1.7% on heating as an organic substance, and therefore it was confirmed that about 2.4% of γ-glycidoxypropyltrtimethoxysilane was grafted.

Also, the following one was used as grafted modified alumina-2.

Prepared for grafted modified alumina-2 was γ-alumina of an amorphous type having an average particle diameter of 0.1 μm which is a value at 50% of a weight integration curve determined by a laser irradiation type particle size distribution-measuring method using laser having a wavelength of 632.8 nm and an average particle diameter of 2 μm which is a value at 99.5% of the weight integration curve. The amorphous γ-alumina of 1 kg was wetted with 30.3 g of γ-glycidoxypropyltrtimethoxysilane (brand name KBM403, a product manufactured by Shin-Etsu Silicone Co., Ltd.) in the presence of an acetone solvent and then dried at 80° C. in a vacuum drier, and it was further grafted and ripened at 80° C. for 48 hours under an atmospheric pressure. A sample dried after washing 5 times 10 parts of grafted modified alumina-2 with 100 parts of a toluene solvent was burned in a porcelain crucible to find that there was a mass-loss of 1.7% on heating as an organic substance, and therefore it was confirmed that about 2.5% of γ-glycidoxypropyltrtimethoxysilane was grafted.

3. Potential Curing Agent for Epoxy Resin (4)

Used respectively were crushed and classified adipic acid dihydrazide (manufactured by Otsuka Chemical Co., Ltd.; hereinafter shown by ADH as an abbreviated name) having an average particle diameter of 1.1 μm which is a value at 50% of a weight integration curve determined by a laser irradiation type particle size distribution-measuring method using laser having a wavelength of 632.8 nm and an average particle diameter of 4.5 μm which is a value at 99.5% of the weight integration curve, a brand name [Fuji Cure FXR-1030] (hereinafter shown by AD1 as an abbreviated name), a product manufactured by Fuji Kasei Ind. Co., Ltd. as an amine adduct-1 and Cat-Z-15 (hereinafter shown by AD2 as an abbreviated name), a product manufactured by Mitsui Chemicals Inc. as an amine adduct-2.

4. Curing Accelerator (7)

Prepared was 3-p-chlorophenyl-1,1-dimethylurea (abbreviated as an accelerator U in the following description) having a purity of 99.7%. It was crushed by means of a pulverizing mill, and used was one having a maximum particle diameter of 4 μm or less (a maximum particle diameter of 4 μm or less which is a value at 99.9% of a weight integration curve determined by a laser irradiation type particle size distribution-measuring method using laser having a wavelength of 632.8 nm.

5. Coupling Agent (6)

Selected and used were γ-glycidoxypropyl-trimethoxysilane (brand name KBM403; a product manufactured by Shin-Etsu Silicone Co., Ltd.) and isocyanatopropyltriethoxysilane (brand name Y-9030; a product manufactured by Nihon Unicar Co., Ltd.).

6. Rubber-like Polymer Fine Particle (2)

The respective compositions prepared in the following synthetic example 1 and synthetic example 2 were used for the rubber-like polymer fine particle.

Synthetic Example 1

Synthesis of rubber-like polymer fine particle (micro cross-linking type acryl rubber fine particle; abbreviated as S-1)-containing epoxy resin composition (a):

A four neck flask of 2000 ml equipped with a stirrer, a gas inlet tube, a thermometer and a cooling tube was charged with 600 g of a bisphenol F type epoxy resin (Epiclon 830S, manufactured by Dainippon Ink and Chemicals Inc.) as a difunctional epoxy resin, 12 g of acrylic acid, 1 g of dimethylethanolamine and 50 g of toluene, and they were reacted at 110° C. for 5 hours while introducing air to introduce a double bond to the epoxy resin. Next, added thereto were 350 g of butyl acrylate, 20 g of glycidyl methacrylate, 1 g of divinylbenzene, 1 g of azobisdimethylvaleronitrile and 2 g of azobisisobutyronitrile, and they were reacted at 70° C. for 3 hours and further at 90° C. for one hour while introducing nitrogen into the reaction system. Then, toluene was removed at 110° C. under reduced pressure to obtain an epoxy resin composition (a) in which homogeneously dispersed was a micro cross-linking type acryl rubber fine particle (S-1) having an average particle diameter of 0.05 $\mu$m determined by a method in which the above composition was quickly cured at a low temperature in the presence of a photocuring catalyst and a breaking face morphology of the cured matter thereof was observed under an electron microscope to determine a particle diameter of the dispersed rubber particle.

It was confirmed that a content of the micro cross-linking type acryl'rubber fine particle (S-1) which was calculated from the amounts of the charged monomers and the residual monomers was 37.9 mass %.

A softening point of the micro cross-linking type acryl rubber fine particle (S-1) which was determined by subjecting the epoxy resin composition (a) to TBA was –42° C.

Synthetic Example 2

Synthesis of silicone base rubber-like polymer fine particle (cross-linking type silicone rubber fine particle; S-2)-containing epoxy resin composition (b):

A four neck flask of 2000 ml equipped with a stirrer, a gas inlet tube, a thermometer and a cooling tube was charged with 600 g of a bisphenol F type epoxy resin (Epiclon 830S, manufactured by Dainippon Ink and Chemicals Inc.) as a difunctional epoxy resin, 12 g of acrylic acid, 1 g of dimethylethanolamine and 50 g of toluene, and they were reacted at 110° C. for 5 hours while introducing air to introduce a double bond to the epoxy resin. Next, added thereto were 5 g of hydroxyacrylate, 10 g of butyl acrylate and 1 g of azobisisobutyronitrile, and they were reacted at 70° C. for 3 hours and further at 90° C. for one hour. Then, toluene was removed at 110° C. under reduced pressure. Next, 700 g of a silicone intermediate having a methoxy group in a molecule and 0.3 g of dibutyltin dilaurate were added thereto and reacted at 150° C. for one hour. In order to remove resulting methanol, the reaction was further continued for one hour. Added was 300 g of a mixture of this grafted resin and a room temperature-curing type silicone rubber of two-liquid type in a mass ratio of 1/1, and reaction was carried out for 2 hours to obtain an S-2-containing epoxy resin composition (b) in which a cross-linking type silicone rubber fine particle was homogeneously dispersed.

It was confirmed that the above composition was the epoxy resin composition (b) in which homogeneously dispersed was a cross-linking type silicone rubber fine particle (S-2) having an average particle diameter of 1.5 $\mu$m determined by a method in which the above composition (b) was quickly cured at a low temperature in the presence of a photocuring catalyst and a breaking face morphology of the cured matter thereof was observed under an electron microscope to determine a particle diameter of the dispersed rubber particle. A content of the fine cross-linking type silicone rubber fine particle (S-2) which was calculated from the amount of the charged monomers was 30.0 mass %.

A softening point of the fine cross-linking type silicone rubber fine particle (S-2) which was determined by subjecting the epoxy resin composition (b) to TBA was –65° C.

7. High Softening Point-polymer Fine Particle (5)

The respective compositions prepared in the following synthetic example 3 to synthetic example 5 were used for the high softening point-polymer fine particle (5).

Synthetic Example 3

Synthesis of high softening point-polymer fine particle (P-1):

A four neck flask of 2000 ml equipped with a stirrer, a gas inlet tube, a thermometer and a reflux condenser was charged with 420.5 g of ion-exchanged water, 10 g of itaconic acid and 2.6 g of [Pelex SS-L] as a surfactant, a product manufactured by Kao Corporation, which is sodium alkyldiphenylether-disulfonate, and the temperature was elevated up to 70° C. while introducing nitrogen. At a stage of reaching the above temperature, added thereto was 11.2 g of an initiator aqueous solution prepared by dissolving 1.2 g of potassium persulfate in 10 g of ion-exchanged water, and further added in a lump sum was a mixed solution comprising 5 g of n-butyl acrylate, 5 g of methyl methacrylate and 0.5 g of hydroxyethyl methacrylate to carry out seed polymerization at 70° C. for 20 minutes. Thereafter, continuously dropwise added in about 4 hours under an environment of the above temperature was an emulsion prepared by mechanically emulsifying a mixed monomer solution of 339 g of methyl methacrylate, 20 g of glycidyl methacrylate, 40 g of n-butyl acrylate and 2 g of 1,6-hexanediol dimethacrylate in an aqueous solution containing 1.8 g of [Pelex SS-L] described above in 160 g of ion-exchanged water. After finishing dropwise adding, the reaction was further continued at the same temperature for one hour to complete the polymerization of the residual monomers to thereby obtain an emulsion solution (Em-1) having a solid content of 39.9 mass %. Subsequently, the solution (Em-1) was treated with a ultrafiltration apparatus using deionized water in 48 hours to remove water-soluble components for refining. The solution (Em-1) obtained after ultrafiltration refining for 48 hours had an ionic conductivity of 0.03 mS/M.

The emulsion solution (Em-1) of 1,000 g obtained after ultrafiltration treatment was treated with a spray drier to obtain 388 g of powder comprising high softening point-polymer fine particles (P-1) having a moisture content of 0.1% or less.

(Em-1) was observed under an electron microscope to determine an average primary particle size of the dispersed particle to find that it was 170 nm (0.17 $\mu$m).

The high softening point-polymer fine particle (P-1) had a micro cross-linking degree of 0.5 mass % in terms of a content of the cross-linkable monomer based on the whole monomers.

The high softening point-polymer fine particle (P-1) had a gel content of 99.9%.

The high softening point-polymer fine particle (P-1) had a softening point of 80° C. which was determined by TBA measurement using a hot melt film thereof.

Synthetic Example 4

Synthesis of high softening point-polymer fine particle (P-2):

A four neck flask of 2000 ml equipped with a stirrer, a gas inlet tube, a thermometer and a reflux condenser was charged with 420.5 g of ion-exchanged water, 1.5 g of 14% aqueous ammonia and 6 g of a 50 mass % aqueous solution of a water-soluble polymer having a mass average molecular weight of 3,100 comprising 0.07 mole % of stearyl methacrylate, 0.1 mole % of polyethylene glycol monomethyl ether monomethacrylate having a mass average molecular weight of 230 and 0.85 mole % of acrylic acid, and the temperature was elevated up to 70° C. while introducing nitrogen. At a stage of reaching the above temperature, added thereto was 11 g of an initiator aqueous solution prepared by dissolving 1 g of 4,4'-azobis(4-cyanosuccinic acid) in 10 g of ion-exchanged water of 60° C., and further added in a lump sum was a mixed solution comprising 2.5 g of n-butyl acrylate, 2.5 g of methyl methacrylate and 0.3 g of hydroxyethyl methacrylate to carry out seed polymerization at 70° C. for 20 minutes. Thereafter, continuously dropwise added in about 4 hours under an-environment of the above temperature was an emulsion prepared by mechanically emulsifying a mixed monomer solution of 5 g of acrylonitrile, 1 g of styrene, 332 g of methyl methacrylate, 40 g of glycidyl methacrylate, 20 g of n-butyl acrylate and 3 g of 1,4-tetramethylenediol dimethacrylate in an aqueous solution comprising 160 g of ion-exchanged water and 3.5 g of the preceding 50 mass % aqueous soluiton of the water-soluble polymer neutralized by aqueous ammonia. After finishing dropwise adding, the reaction was further continued at the same temperature for one hour to complete the polymerization of the residual monomers to thereby obtain an emulsion solution (Em-2) having a solid content of 39.2 weight-%.

The emulsion solution (Em-2) of 1,000 g was treated with a ultrafiltration apparatus using deionized water for 24 hours to remove water-soluble components for refining. The solution (Em-2) obtained after 24 hours had an ion conductivity of 0.02 mS/7m.

The emulsion solution (Em-2) obtained after ultrafiltration treatment was treated with a spray drier to obtain 380 g of powder comprising high softening point-polymer fine particles (P-2) having a moisture content of 0.1% or less and a softening point of 76° C.

(Em-2) was measured by means of a laser irradiation type particle size-measuring equipment to determine an average primary particle size of the dispersed particle to find that it was 290 nm (0.29 µm).

The high softening point-polymer fine particle (P-2) had a micro cross-linking degree of 0.7 mass % in terms of a content of the cross-linkable monomer based on the whole monomers.

The high softening point-polymer fine particle (P-2) had a gel content of 99.8% which was determined from a methylcarbitol dissolving method.

Synthetic Example 5

Synthesis of high softening point-polymer fine particle (P-3):

A four neck flask of 2000 ml equipped with a stirrer, a gas inlet tube, a thermometer and a reflux condenser was charged with 420.5 g of ion-exchanged water, 10 g of itaconic acid, 0.5 g of [Pelex SS-L] as a surfactant, a product manufactured by Kao Corporation, which is sodium alkyldiphenylether-disulfonate and 2 g of brand name [Aquaron RN-20], a product manufactured by Daiichi Kogyo Seiyaku Co., Ltd. as a nonionic reactive surfactant, and the temperature-was elevated up to 70° C. while introducing nitrogen. At a stage of reaching the above temperature, added thereto was 11 g of an initiator aqueous solution prepared by dissolving 1 g of 2,2'-azobis[2-methyl-N-(2-hydroxyethyl)propionamide] in 10 g of ion-exchanged water, and further added in a lump sum was a mixed solution comprising 10 g of n-butyl acrylate, 10 g of methyl methacrylate and 1 g of hydroxyethyl methacrylate to carry out seed polymerization at 70° C. for 30 minutes. Thereafter, continuously dropwise added in about 4 hours under an environment of the above temperature was an emulsion prepared by mechanically emulsifying a mixed monomer solution of 339 g of methyl methacrylate, 20 g of glycidyl methacrylate, 40 g of n-butyl acrylate and 2 g of 1,6-hexanediol dimethacrylate in an aqueous solution containing 0.5 g of [pelex SS-L] and 1.5 g of [Aquaron RN-20] each described above in 160 g of ion-exchanged water. After finishing dropwise adding, the reaction was further continued at the same temperature for one hour to complete the polymerization of the residual monomers to thereby obtain an emulsion solution (Em-3) having a solid content of 39.5 mass %.

The emulsion solution (Em-3) of 1,000 g was treated with a ultrafiltration apparatus using deionized water in 72 hours to remove water-soluble components for refining. The solution (Em-3) obtained after 72 hours had an ionic conductivity of 0.04 mS/m.

The emulsion solution (Em-3) obtained after ultrafiltration treatment was treated with a freeze drier to obtain 390 g of powder comprising high softening point-polymer fine particles (P-3) having a moisture content of 0.14% and a softening point of 83° C.

The high softening point-polymer fine particle (P-3) was observed under an electron microscope to determine a maximum particle size of the primary dispersed particle to find that it was 1.1 µm.

8. Low Softening Point-polymer Fine Particle

A composition prepared in the following comparative synthetic example 1 was used for the low softening point-polymer fine particle for comparison.

Comparative Synthetic Example 1

Synthesis of low softening point-polymer fine particle (Q-1):

A four neck flask of 2000 ml equipped with a stirrer, a gas inlet tube, a thermometer and a reflux condenser was charged with 420.5 g of ion-exchanged water, 10 g of itaconic acid and 2.5 g of [Pelex SS-L] as a surfactant, a product manufactured by Kao Corporation, which is sodium alkyldiphenylether-disulfonate, and the temperature was elevated up to 70° C. while introducing nitrogen. At a stage of reaching the above temperature, added thereto was 11 g of an initiator aqueous solution prepared by dissolving 1 g of 2,2'-azobis[2-methyl-N-(2-hydroxyethyl)propionamide] in 10 g of ion-exchanged water, and further added in a lump sum was a mixed solution comprising 10 g of n-butyl acrylate, 10 g of methyl methacrylate and 1 g of hydroxyethyl methacrylate to carry out seed polymerization at 70° C. for 30 minutes. Thereafter, continuously dropwise added in about 4 hours under an environment of the above temperature was an emulsion prepared by mechanically emulsifying a mixed monomer solution of 210 g of methyl methacrylate, 17 g of glycidyl methacrylate, 150 g of n-butyl acrylate and 5 g of 1,6-hexanediol dimethacrylate in an aqueous solution containing 2 g of [Pelex SS-L] described above in 160 g of ion-exchanged water. After finishing dropwise adding, the reaction was further continued at the same temperature for one hour to complete the polymerization of the residual monomers to thereby obtain an emulsion solution (Em-4) having a solid content of 39.5 mass %.

The emulsion solution (Em-4) of 1,000 g was treated with a ultrafiltration apparatus using deionized water in 48 hours to remove water-soluble components for refining. The solution (Em-4) obtained after 48 hours had an ionic conductivity of 0.03 S/m.

The emulsion solution (Em-4) obtained after ultrafiltration treatment was treated with a freeze drier to obtain 387 g of powder comprising a low softening point-polymer fine particle (Q-1) having a moisture content of 0.14% and a softening point of about 45° C.

(Q-1) was observed under an electron microscope to determine a maximum particle size of the primary dispersed particle to find that it was 0.2 $\mu$m.

Example 1

Added to a solution obtained by dissolving 30 parts of [Epotote YDCN] as a novolak epoxy resin in 20 parts of methylcarbitol were 60 parts of [Epiclon 830S] as a bisphenol F type epoxy resin, 46 parts of the epoxy resin composition (a) in which homogeneously dispersed were the micro cross-linking type acryl rubber fine particle (S-1) having an average particle diameter of 0.05 $\mu$m, 15 parts of ADH as a potential curing agent for epoxy resin, 0.2 part of the accelerator-U, 2 parts of titanium oxide [CR-EL], 1 part of the amorphous silica-2, 10.8 parts of the grafted modified alumina-1, 10 parts of the high softening point-polymer fine particle (P-1) and 5 parts of the silane coupling agent KBM403, and they were pre-mixed by means of a Dalton mixer and then kneaded by means of a three roll mill until the solid materials were pulverized to 5 $\mu$m or less. The kneaded matter was subjected to vacuum degassing treatment to obtain a liquid crystal sealant composition (E1).

The liquid crystal sealant composition (E1) comprises an epoxy resin having 2.5 epoxy groups on an average in a molecule and has an epoxy resin content of 59.3%, a rubber-like polymer fine particle content of 8.7%, an inorganic filler content of 6.9%, a high softening point-polymer fine particle content of 5%, a silane coupling agent content of 2.5%, a potential curing agent for epoxy resin content of 7.5%, an accelerator content of 0.1% and a solvent content of 10%.

The initial viscosity at 25° C. determined by an E type viscometer was 35 to 45 Pa·s.

Respectively shown in Table 1 are results of a storage stability test, a coating workability test, a moisture permeability characteristic, a viscosity characteristic after the B stage, a glass transition temperature measurement, a linear expansion coefficient measurement and a free ion concentration measurement of the liquid crystal sealant composition (E1).

The composition (E1) had a starting temperature of 113.5° C. determined by DSC and a Top temperature of 162° C.

Blended with 100 parts of the liquid crystal sealant composition (E1) was 5 parts of a glass short fiber spacer of 5 $\mu$m, and they were sufficiently mixed to obtain a vacuum-degassed composition. The resulting vacuum-degassed composition was dispenser-coated on a glass substrate for a liquid crystal cell provided with transparent electrodes and an alignment film (hereinafter referred to merely as an ITO substrate in the following description) in a pattern comprising 4 one inch-size cells which are disposed vertically and horizontally two by two on a substrate to obtain the ITO substrate which is coated the sealant in width of about 0.7 mm and thickness of about 22 to 25 $\mu$m. Then, it was dried in a hot air drier at 80° C. for 20 minutes and put on another ITO substrate which was to be paired, and after adjusting the position, a primary bonding-sealing test was repeatedly carried out ten times at a press pressure of 0.03 MPa/cm$^2$ and 170° C. for 6 minutes by means of a normal single layer hot press manufactured by Joyo Engineering Co., Ltd.

As a result, obtained was even no one sample having inferior spots in sealing caused by bubbles through the seal (seal leak) and disturbed seal lines, and the substrate for a liquid crystal display cell having a prescribed cell gap thickness of 5±0.1 $\mu$m was able to be produced in all lots. Further, 5 cells out of them were left standing in a vacuum drier at 150° C. for 90 minutes to obtain the completely cured cells. Next, 2 cells were cut off independently and then subjected to a heat resistant peeling test of cell by wedge and a peeling test of cell by wedge after a pressure cooker test at 120° C. for 3 hours, and the remaining 3 cells were subjected to a sealing function durability test. The results thereof are shown in Table-1.

Example 2

An liquid crystal sealant composition (E2) was obtained in the same manner as in Example 1, except that the same parts of the high softening point-polymer fine particle (P-2) was substituted for the high softening point-polymer fine particle (P-1).

The liquid crystal sealant composition (E2) comprises an epoxy resin having 2.5 epoxy groups on an average in a molecule and has an epoxy resin content of 59.3%, a rubber-like polymer fine particle content of 8.7%, an inorganic filler content of 6.9%, a high softening point-polymer fine particle content of 5%, a silane coupling agent content of 2.5%, a potential curing agent for epoxy resin content of 7.5%, an accelerator content of 0.1% and a solvent content of 10%.

The initial viscosity at 25° C. determined by the E type viscometer was 30 to 40 Pa·s.

Respectively shown in Table 1 are results of a storage stability test, a coating workability test, a moisture permeability characteristic, a viscosity characteristic after the B stage, a glass transition temperature measurement, a linear expansion coefficient measurement and a free ion concentration measurement of the liquid crystal sealant composition (E2).

The composition (E2) had a starting temperature of 115° C. determined by DSC and a Top temperature of 160° C.

Blended with 100 parts of the liquid crystal sealant composition (E2) was 3 parts of a spherical silica spacer of 5 $\mu$m, and they were sufficiently mixed to obtain a vacuum-degassed composition. The resulting vacuum-degassed composition was dispenser-coated on an ITO substrate provided with transparent electrodes and an alignment film in a pattern comprising 4 one inch-size cells which are disposed vertically and horizontally two by two on a substrate to obtain the ITO substrate which is coated the sealant in width of about 0.65 mm and thickness of about 20 to 22 μm. Then, it was dried in a hot air drier at 80° C. for 20 minutes and put on another ITO substrate which was to be paired, and after adjusting the position, a primary bonding-sealing test was repeatedly carried out ten times at a press pressure of 0.05 MPa/cm² and 150° C. for 15 minutes by means of a normal single layer hot press manufactured by Joyo Engineering Co., Ltd.

As a result, obtained was even no one sample having inferior spots in sealing caused by bubbles through the seal (seal leak)and disturbed seal lines, and the substrate for a liquid crystal display cell having a prescribed cell gap thickness of 5±0.1 μm was able to be produced in all lots. Further, 5 cells out of them were left standing in a vacuum drier at 150° C. for 90 minutes to obtain the completely cured cells. Next, 2 cells were cut off independently and then subjected to a heat resistant peeling test of cell by wedge and a peeling test of cell by wedge after a pressure cooker test at 120° C. for 3 hours, and the presence of inferior spots through the seal and a linearity of the seal lines in the resulting cells were observed under a magnifying glass. The results thereof are shown in Table 1. Further, the resulting 3 cells were subjected to a sealing function durability test, and the results thereof are shown in Table 1.

Example 3

Ten parts of Epikote EP-1004 and 23 parts of Epikote EP-1001 were dissolved in advance in 20 parts of a mixed solution comprising butyl cellosolve and ethyl cellosolve as non-reactive solvents in a mass ratio of 1:1, and added to the solution were 40 parts of [Epiclon 830S] as a bisphenol F type epoxy resin, 16 parts of [Epotote YH-434] as an aminoepoxy resin, 42 parts of the epoxy resin composition (b) in which homogeneously dispersed were the micro cross-linking type silicone rubber fine particle (S-2) having an average particle diameter of 1.5 μm, 13 parts of ADH as a potential curing agent for epoxy resin, 1.6 parts of the accelerator-U, 1 part of titanium oxide [CR-EL], 1 part of the amorphous silica-2, 15.4 parts of the grafted modified alumina-2, 16 parts of the high softening point-polymer fine particle (P-3) and 1 part of KBM403, and they were premixed by means of a Dalton mixer and then kneaded by means of a three roll mill until the solid materials were pulverized to 5 μm or less. The kneaded matter was subjected to vacuum degassing treatment to obtain-a liquid crystal sealant composition (E3).

The liquid crystal sealant composition (E3) comprises an epoxy resin having 2.2 epoxy groups on an average in a molecule and has an epoxy resin content of 59.2%, a rubber-like polymer fine particle content of 6.3%, an inorganic filler content of 8.7%, a high softening point-polymer fine particle content of 8%, a silane coupling agent content of 0.5%, a potential curing agent for epoxy resin content of 6.5%, an accelerator content of 0.8% and a solvent content of 10%.

The initial viscosity determined at 25° C. by an E type viscometer was 55 to 60 Pa·s.

Respectively shown in Table 1 are results of a storage stability test, a coating workability test, a moisture permeability characteristic, a viscosity characteristic after the B stage, a glass transition temperature measurement, a linear expansion coefficient measurement and a free ion concentration measurement of the liquid crystal sealant composition (E3).

The composition (E3) had a starting temperature of 107° C. determined by DSC and a Top temperature of 156° C.

Blended with 100 parts of the liquid crystal sealant composition (E3) was 3 parts of a spherical silica spacer of 5 μm, and they were sufficiently mixed to obtain a vacuum-degassed composition. The resulting vacuum-degassed composition was screen-printed on an ITO substrate provided with transparent electrodes and an alignment film in a pattern comprising 4 one inch-size cells which are disposed vertically and-horizontally two by two on a substrate to obtain the ITO substrate having which is coated the sealant in width of about 1 mm and thickness of about 20 to 22 μm. Then, it was dried in a hot air drier at 80° C. for 20 minutes and put on another ITO substrate which was to be paired, and after adjusting the position, a primary bonding-sealing test was repeatedly carried out ten times at a press pressure of 0.05 MPa/cm² and 150° C. for 20 minutes by means of a vacuum single layer press.

As a result, obtained was even no one sample having inferior spots in sealing caused by bubbles through the seal (seal leak) and disturbed seal lines, and the substrate for a liquid crystal display cell having.a prescribed cell gap thickness of 5±0.1 μm was able to be produced in all lots. Further, 5 cells out of them were left standing in a vacuum drier of 150° C. for 60 minutes to obtain the completely cured cells. Next, 2 cells were cut off independently and then subjected to a heat resistant peeling test of cell by wedge and a peeling test of cell by wedge after a pressure cooker test at 120° C. for 3 hours, and the presence of inferior spots through the seal and a linearity of the seal lines in the resulting cells were observed under a magnifying glass. The results thereof are shown in Table 1.

Further, the resulting 3 cells were subjected to a sealing function durability test, and the results thereof are shown in Table 1.

Example 4

An liquid crystal-sealant composition (E4) was obtained in the same manner as in Example 3, except that 10 parts of t-BPMG and 10 parts of 1,6-hexanediol diglycidyl ether as reactive diluents were substituted for 20 parts of the mixed solution comprising butyl cellosolve and ethyl cellosolve.

The liquid crystal sealant composition (E4) comprises an epoxy resin having 2.1 epoxy groups on an average in a molecule and has an epoxy resin content of 69.2%, a rubber-like polymer fine particle content of 6.3%, an inorganic filler content of 8.7%, a high softening point-polymer fine particle content of 8%, a silane coupling agent content of 0.5%, a potential curing agent for epoxy resin content of 6.5%, an accelerator content of 0.8% and a solvent content of 0%.

The initial viscosity at 25° C. determined by the E type viscometer was 60 to 70 Pa·s.

Respectively shown in Table 1 are results of a storage stability test, a coating workability test, a moisture permeability characteristic, a viscosity characteristic after the B stage, a glass transition temperature measurement, a linear expansion coefficient measurement and a free ion concentration measurement result of the liquid crystal sealant composition (E4).

The composition (E4) had a starting temperature of 106.5° C. determined by DSC and a Top temperature of 157° C.

Blended with 100 parts of the liquid crystal sealant composition (E4) was 3 parts of a spherical silica spacer of 5 μm, and they were sufficiently mixed to obtain a vacuum-degassed composition. The resulting vacuum-degassed composition was dispenser-coated on an ITO substrate provided with transparent electrodes and an alignment film in a pattern comprising 4 one inch-size cells which are disposed vertically and horizontally two by two on a substrate to obtain the ITO substrate which is coated the a sealant in width of about 0.75 mm and thickness of about 28 to 32 μm. Then, it was dried in a hot air drier at 100° C. for 10 minutes and put on another ITO substrate which was to be paired, and after adjusting the position, a primary bonding-sealing test was repeatedly carried out ten times at a press pressure of 0.05 MPa/cm$^2$ and 180° C. for 6 minutes by means of a normal single layer hot press manufactured by Joyo Engineering Co., Ltd.

As a result, obtained was even no one sample having inferior sealing caused by bubbles through the seal (seal leak), and the substrate for a liquid crystal display cell having a prescribed cell gap thickness of 5±0.1 μm was able to be produced in all lots. Then, 5 cells out of them were further left standing in a vacuum drier at 150° C. for 60 minutes to obtain the completely cured cells. Next, 2 cells were cut off independently and then subjected to a heat resistant peeling test of cell by wedge and a peeling test of cell by wedge after a pressure cooker test at 120° C. for 3 hours, and the presence of inferior spots through the seal and a linearity of the seal lines in the resulting cells were observed under a magnifying glass. The results thereof are shown in Table 1.

Further, the resulting 3 cells were subjected to a sealing function durability test, and the results thereof are shown in Table 1.

Example 5

Added to a solution obtained by dissolving 22 parts of [Epotote YDCN-702P] as a novolak epoxy resin in 30 parts of 2-EHG and 10 parts of 1,6-hexanediol diglycidyl ether were 42 parts of [EPOMIK R-140P] as a bisphenol A type epoxy resin, 40 parts of the epoxy resin composition (a) in which homogeneously dispersed were the micro cross-linking type acryl rubber micro particle (S-1) having an average particle diameter of 0.05 μm, 8 parts of AD1 as a potential curing agent for epoxy resin, 6 parts of Cat-Z-15, 2 parts of adipic acid, 3 parts of the amorphous silica-2, 18 parts of the grafted modified alumina-2, 7 parts of the high softening point-polymer fine particle (P-2), 1 part of the silane coupling agent KBM403 and 3 parts of the silane coupling agent Y-9030, and they were pre-mixed by means of a Dalton mixer and then kneaded by means of a three roll mill until the solid materials were pulverized to 5 μm or less. The kneaded matter was subjected to vacuum degassing treatment to obtain a liquid crystal sealant composition (E5).

The liquid crystal sealant composition (E5) comprises an epoxy resin having 1.9 epoxy groups on an average in a molecule and has an epoxy resin content of 64.6%, a rubber-like polymer fine particle content of 7.4%, an inorganic filler content of 10.5%, a high softening point-polymer fine particle content of 3.5%, a silane coupling agent content of 2%, a potential curing agent for epoxy resin content of 11%, an adipic acid content of 1% which is a curing accelerator and a solvent content of 0%.

The initial viscosity at 25° C. determined by an E type viscometer was 17 to 22 Pa·s.

Respectively shown in Table 1 are results of a storage stability test, a coating workability test, a moisture permeability characteristic, a viscosity characteristic after the B stage, a glass transition temperature measurement, a linear expansion coefficient measurement and a free ion concentration measurement of the liquid crystal sealant composition (E5).

The composition (E5) had a starting temperature of 70.5° C. determined by DSC and a Top temperature of 136.5° C.

Blended with 100 parts of the liquid crystal sealant composition (E5) was 5 parts of a glass short fiber spacer of 5 μm, and they were sufficiently mixed to obtain a vacuum-degassed composition. The resulting vacuum-degassed composition was screen-printed on a polyethylene terephthalate plastic substrate for a liquid crystal cell provided with transparent electrodes and an alignment film (hereinafter referred to merely as an ITO plastic substrate in the following description) in a pattern comprising 4 one inch-size cells which are disposed vertically and horizontally two by two on a substrate to obtain the ITO plastic substrate which is coated the sealant in width of about 1.5 mm and thickness of about 25 to 28 μm. Then, it was dried in a hot air drier of 100° C. for 20 minutes and put on another ITO plastic substrate which was to be paired, and after adjusting the position, a primary bonding-sealing test was repeatedly carried out ten times at a press pressure of 0.01 MPa/cm$^2$ and 120° C. for 30 minutes by means of a normal single layer hot press manufactured by Joyo Engineering Co., Ltd.

As a result, obtained was even no one sample having inferior sealing caused by bubbles through the seal (seal leak), and the substrate for a liquid crystal display cell having a prescribed cell gap thickness of 5±0.1 μm was able to be produced in all lots.

Then, 5 cells out of them were further left standing in a vacuum drier at 120° C. for 120 minutes to obtain the completely cured cells. Next, 2 cells were cut off independently and then subjected to a heat resistant peeling test of cell by wedge and a peeling test of cell by wedge after dipping in warm water of 80° C. for 5 hours, and the presence of inferior spots through the seal and a linearity of the seal lines in the resulting cells were observed under a magnifying glass. The results thereof are shown in Table 1.

Further, the resulting 3 cells were subjected to a sealing function durability test, and the results thereof are shown in Table 1.

Example 6

A reaction flask of 500 ml capacity was charged in advance with 42 parts of [Epotote YDCN] as a novolak epoxy resin, 133 parts of [Epiclon 830S] and 31.76 parts of diethylene glycol monomethyl ether as a solvent, and 160 parts of polypropylene glycol having a primary amino group at both ends and an amine value of 800 was added thereto while stirring to react them at 120° C. for one hour, whereby a modified epoxy resin was obtained. Added to 66.45 parts of the modified epoxy resin were 42.3 parts of the epoxy resin composition (a) in which homogeneously dispersed were the micro cross-linking type acryl rubber fine particle (S-1) having an average particle diameter of 0.05 μm, 13.89 parts of ADH as a potential curing agent for epoxy resin, 36.25 parts of the grafted modified alumina-2, 16.31 parts of the high softening point-polymer fine particle (P-1) and 24.79 parts of diethylene glycol monomethyl ether, and they were pre-mixed by means of a Dalton mixer and then kneaded by means of a three roll mill until the solid materials were pulverized to 5 μm or less. The kneaded matter was subjected to vacuum defoaming treatment to obtain a liquid crystal sealant composition (B1).

The liquid crystal sealant composition (B1) has a modified epoxy resin content of 43.48%, a solvent content of 15.27%, a rubber-like polymer fine particle content of 8.02%, an inorganic filler content of 18.12%, a high softening point-polymer fine particle content of 8.16% and a potential curing agent for epoxy resin content of 6.95%.

An aqueous solution obtained by admixing the liquid crystal sealant composition (B1) with the same mass of purified water had an ionic conductivity of 0.3 mS/m or less.

A viscosity of a coated material obtained by coating the above liquid crystal sealant composition (B1) on a release film in a thickness of 50 µm and subjecting it to heat treatment at 100° C. for 20 minutes was about 2500 Pa·s/80° C. in terms of a rotation viscosity at 0.5 rpm, about 450 Pa·s/80° C. in terms of a rotation viscosity at 5 rpm and 2100 Pa·s/100° C. in terms of a rotation viscosity at 0.5 rpm by an E type viscometer.

The cured matter of the above liquid crystal sealant composition (B1) had a linear expansion coefficient of $4.9 \times 10^{-5}$ mm/mm/° C. at 0° C. to 100° C., which was determined by means of TMA, a Tg of 128° C. and a moisture permeability at 80° C. of 147 g/m$^2$·24 hours.

The composition (B1) had a starting temperature of 128° C. determined by DSC and a Top temperature of 179° C.

An aqueous solution obtained by admixing a liquid crystal sealant composition (B1 improved) comprising 100 parts of the liquid crystal sealant composition (B1), 1 part of the silane coupling agent KBM403 and 2 parts of the accelerator-U with the same mass of purified water had an ionic conductivity of 0.3 mS/m or less, which was unchanged. A viscosity of a coated material obtained by coating the liquid crystal sealant composition (B1 improved) on a release film in a thickness of 50 µm and subjecting it to heat treatment at 100° C. for 20 minutes was about 2750 Pa·s/80° C. in terms of a rotation viscosity at 0.5 rpm, about 510 Pa·s/80° C. in terms of a rotation viscosity at 5 rpm and 2600 Pa·s/100° C. in terms of a rotation viscosity at 0.5 rpm by an E type viscometer. They were a little more improved than the characteristics of the composition (B1).

The cured matter of the above liquid crystal sealant composition (B1 improved) had a linear expansion coefficient of $5.0 \times 10^{-5}$ mm/mm/° C. at 0° C. to which was determined by means of TMA, a Tg of 124° C. and a moisture permeability at 80° C. of 145 g/m$^2$·24 hours, and it was found that they were not very different from those of the composition (B1).

A maximum exothermic peak temperature of the liquid crystal sealant composition (B1 improved) exhibited 161° C., which was determined from a thermogram obtained by differential scanning calorimetry (DSC) in which 10 mg of the composition was heated at a constant rate of 5° C./minute in an inert gas environment, and the exothermic starting temperature was 115° C.

Blended with 100 parts of the liquid crystal sealant composition (B1 improved) was 3 parts of a spherical silica spacer of 5 µm, and they were sufficiently mixed to obtain a vacuum-degassed composition. The resulting vacuum-degasssed composition was screen-printed on an ITO substrate provided with transparent electrodes and an alignment film in a pattern comprising 4 one inch-size cells which are disposed vertically and horizontally two by two on a substrate to obtain the ITO substrate which is coated the sealant in width of about 1 mm and thickness of about 20 to 22 µm. Then, it was dried in a hot air drier at 80° C. for 20 minutes and put on another ITO substrate which was to be paired, and after adjusting the position, a primary bonding-sealing test was repeatedly carried out ten times at a press pressure of 0.05 MPa/cm$^2$ and 180° C. for 6 minutes by means of a normal single layer hot press manufactured by Joyo Engineering Co., Ltd.

As a result, obtained was even no one sample having inferior spots in sealing caused by bubbles through the seal (seal leak) and disturbed seal lines, and the substrate for a liquid crystal display cell having a prescribed cell gap thickness of 5±0.1 µm was able to be produced in all lots.

The resulting cell was dipped in warm water at 80° C. for 5 hours and then subjected to a peeling test by wedge. As a result, the adhesive caused cohesive failure and was excellent in adhesion reliability. Further, a change in the display function was observed after 500 hours passed in the seal function durability test. As a result, uneven display was slightly observed within 500 µm in terms of a distance from the sealed edge in the circumference of the cell, and the display function was good in the part other than the above.

Example 7

A reaction flask of 500 ml capacity was charged in advance with 42 parts of [Epotote YDCN] as a novolak epoxy resin, 133 parts of [Epiclon 830S] and 250 parts of toluene as a solvent, and 100 parts of polydimethylsiloxane having a primary amino group at both ends and an amine value of 1500 (X-22-161B: a product manufactured by Shin-Etsu Silicone Co., Ltd.) was added thereto while stirring to react them at 120° C. for 2 hours and then the solvent was removed at the same temperature under reduced pressure, whereby 275 parts of a modified epoxy resin was obtained. Added to 54.1 parts of the modified epoxy resin were 37.1 parts of the epoxy resin composition (a) in which homogeneously dispersed were the micro cross-linking type acryl rubber fine particle (S-1) having an average particle diameter of 0.05 µm, 20 parts of DDH as a potential curing agent for epoxy resin, 47.4 parts of the grafted modified alumina-2, 11.8 parts of the high softening point-polymer fine particle (P-1) and 29.6 parts of propylene glycol monomethyl ether acetate, and they were pre-mixed by means of a Dalton mixer and then kneaded by means of a three roll mill until the solid materials were pulverized to 5 µm or less. The kneaded matter was subjected to vacuum defoaming treatment to obtain a liquid crystal sealant composition (B2).

The liquid crystal sealant composition (B2) has a modified epoxy resin content of 38.57%, a solvent content of 14.8%, a rubber-like polymer fine particle content of 7.03%, an inorganic filler content of 23.7%, a high softening point-polymer fine particle content of 5.9% and a potential curing agent for epoxy resin content of 10%.

An aqueous solution obtained by admixing the liquid crystal sealant composition (B2) with the same mass of purified water had an ion conductivity of 0.3 mS/m or less. A viscosity of a coated material obtained by coating the liquid crystal sealant composition (B2) on a release film in a thickness of 50 µm and subjecting it to heat treatment at 100° C. for 20 minutes was about 850 Pa·s/80° C. in terms of a rotation viscosity at 0.5 rpm, about 150 Pa·s/80° C. in terms of a rotation viscosity at 5 rpm and 900 Pa·s/100° C. in terms of a rotation viscosity at 0.5 rpm by an E type viscometer.

The cured matter of the above liquid crystal sealant composition (B2) had a linear expansion coefficient of $3.6 \times 10^{-5}$ mm/mm/° C. at 0° C. to 100° C., which was determined by means of TMA, a Tg of 115° C. and a moisture permeability of 133 g/m$^2$·24 hours at 80° C.

An aqueous solution obtained by admixing a liquid crystal sealant composition (B2 improved) comprising 100 parts of the liquid crystal sealant composition (B2), 1 part of the silane coupling agent KBM403 and 2 parts of the accelerator-U with the same mass of purified water had an ionic conductivity of 0.3 mS/m or less, which was unchanged. A viscosity of a coated material obtained by coating the liquid crystal sealant composition (B2 improved) on a release film in a thickness of 50 μm and subjecting it to heat treatment at 100° C. for 20 minutes was about 970 Pa·s/80° C. in terms of a rotation viscosity at 0.5 rpm, about 200 Pa·s/80° C. in terms of a rotation viscosity at 5 rpm and 1100 Pa·s/100° C. in terms of a rotation viscosity at 0.5 rpm by an E type viscometer. They were a little more improved than the characteristics of the composition (B2).

The cured matter of the above liquid crystal sealant composition (B2 improved) had a linear expansion coefficient of $3.5 \times 10^{-5}$ mm/mm/° C. at 0° C. to 100° C., which was determined by means of TMA, a Tg of 117° C. and a moisture permeability at 80° C. of 141 g/m$^2$·24 hours, and it was found that they were not very different from those of the composition (B2).

Blended with 100 parts of the liquid crystal sealant composition (B2 improved) was 3 parts of a spherical silica spacer of 5μm, and they were sufficiently mixed to obtain a vacuum-degassed composition. The resulting vacuum-degassed composition was dispenser-coated on an ITO substrate provided with transparent electrodes and an alignment film in a pattern comprising 2 cells of a 14 inch-size on a substrate to obtain the ITO substrate which is coated the sealant in width of about 1 mm and a thickness of about 20 to 22 μm. Then, it was dried in a hot air drier at 100° C. for 15 minutes and put on another ITO substrate which was to be paired, and after adjusting the position, a primary bonding-sealing test was repeatedly carried out ten times at a press pressure of 0.05 MPa/cm$^2$ and 180° C. for 6 minutes by means of a normal single layer hot press manufactured by Joyo Engineering Co., Ltd.

As a result, obtained was even no one sample having inferior spots in sealing caused by bubbles through the seal (seal leak) and disturbed seal lines, and the substrate for a liquid crystal display cell having a prescribed cell gap thickness of 5±0.1 μm was able to be produced in all lots.

The resulting cell was dipped in warm water-at 80° C. for 5 hours and then subjected to a peeling test by wedge. As a result, the adhesive caused cohesive failure and was excellent in adhesion reliability. Further, a change in the display function was observed after 500 hours passed in the seal function durability test. As a result, uneven display was slightly observed within 500 μm in terms of a distance from the sealed edge in the circumference of the cell, and the display function was good in the part other than the above.

Comparative Example 1

A comparative liquid crystal sealant composition (F1) was prepared in the same manner as in Example 1, except that 31.6 parts of a bisphenol F type epoxy resin [Epiclon 830] was substituted for 31.6 parts of the bisphenol F type epoxy resin [Epiclon 830S] and 10.8 parts of amorphous alumina was substituted for 10.8 parts of the grafted modified alumina-1 and that the high softening point-polymer fine particle (P-1) was not added.

The liquid crystal sealant composition (F1) comprises an epoxy resin having 2.5 epoxy groups on an average in a molecule and has an epoxy resin content of 62.4%, a rubber-like polymer fine particle content of 9.1%, an inorganic filler content of 7.3%, a silane coupling agent content of 2.6%, a potential curing agent for epoxy resin content of 7.9%, an accelerator content of 0.11% and a solvent content of 10.5%. The initial viscosity at 25° C. determined by an E type viscometer was 10 to 15 Pa·s.

Shown in Table 1 are results of a storage stability test and a coating workability test of the liquid crystal sealant composition (F1).

The composition (F1) had a starting temperature of 115° C. determined by DSC and a Top temperature of 161° C.

Blended with 100 parts of the liquid crystal sealant composition (F1) was 5 parts of a glass short fiber spacer of 5 μm, and they were sufficiently mixed to, obtain a vacuum-degassed composition. The resulting vacuum-degassed composition was dispenser-coated on an ITO substrate provided with transparent electrodes and an alignment film in a pattern comprising 4 one inch size-cells which are disposal vertically and horizontally two by two on a substrate to obtain the ITO substrate which is coated the sealant in width of about 0.5 mm and thickness of about 20 to 22 μm. Then, it was dried in a hot air drier at 100° C. for 20 minutes and put on another ITO substrate which was to be paired, and after adjusting the position, a primary bonding and sealing test was repeatedly carried out ten times at a press pressure of 0.03 MPa/cm$^2$ and 170° C. for 6 minutes by means of a normal single layer hot press manufactured by Joyo Engineering Co., Ltd.

As a result, inferior spots in sealing caused by bubbles through the seal (seal leak) and disturbed seal lines were caused at a probability of 9/10.

Accordingly, it was confirmed that the liquid crystal sealant composition prepared in Comparative Example 1 was lacking in a single layer hot press aptitude.

Shown in Table 1 are a heat resistant peeling test of cell by wedge, a peeling test of cell by wedge after dipping in warm water at 80° C. for 5 hours and a seal function durability test using an eligible cell which had no through bubbles (seal leak) produced.

Comparative Example 2

Added to a solution obtained by dissolving 20 parts of [Epotote YDCN] as a novolak epoxy resin in 5 parts of methylcarbitol were 43.5 parts of [Epiclon 830] as a bisphenol F type epoxy resin, 7.5 parts of ADH as a potential curing agent for epoxy resin, 0.5 part of the accelerator-U, 1 part of the amorphous silica-2, 6.5 parts of amorphous alumina, 15 parts of the high softening point-polymer fine particle (P-1) and 1 part of the silane coupling agent KBM403, and they were pre-mixed by means of a Dalton mixer and then kneaded by means of a three roll mill until the solid materials were pulverized to 5 μm or less. The kneaded matter was subjected to vacuum degassed treatment to obtain a liquid crystal sealant composition (F2).

The liquid crystal sealant composition (F2) has a high softening point-polymer fine particle content of 15%. The initial viscosity at 25° C. determined by an E type viscometer exceeded 200 Pa·s, and the thixotropic index was as very high as 5 to 6. Accordingly, the dispenser coating work was able to be done by some means or other, but the screen printing workability was markedly inferior, and a lot of print blurring was brought about.

Blended with 100 parts of the liquid crystal sealant composition (F2) was 5 parts of a glass short fiber spacer of 5 μm, and they were sufficiently mixed to obtain a vacuum-degassed composition. The resulting vacuum-degassed composition was dispenser-coated on an ITO substrate provided with transparent electrodes and an alignment film in a pattern comprising 4 one inch size-cells which are disposed vertically and horizontally two by two on a substrate to obtain the ITO substrate which was coated the sealant in width of about 0.4 mm and thickness of about 40 to 45 μm. Then, it was dried in a hot air drier of 100° C. for 20 minutes, and the surface of the sealing material was put into the state that tackiness is scarcely present thereon, In this state, another ITO substrate was put thereon, and after adjusting the position, a primary bonding-sealing test was repeatedly carried out five times at a press pressure of 0.02 to 0.05 MPa/cm² and 180° C. for 6 minutes by means of a normal single layer hot press manufactured by Joyo Engineering Co., Ltd. In all lots, however, the cell gap width was not reduced to 6 μm or less, and the desired gap width of 5 μm was not able to be achieved at all. Inferior spots in sealing and disturbed seal lines were not observed to be caused, but it was confirmed that the liquid crystal sealant composition (F2) was notably lacking in a gap width-forming workability which was important for adhesion workability.

Comparative Example 3

A liquid crystal sealant composition (F3) was produced in the same manner as in Example 1, except that the same parts of the low softening point-polymer fine particle (Q-1) was substituted for the high softening point-polymer fine particle (P-1).

As a result, a viscosity of the liquid crystal sealant composition (F3) at 25° C. was an initial viscosity exceeding 100 Pa·s, and a marked change with the passage of time was observed. A change in the viscosity exceeding three times was exhibited after 12 hours. Accordingly, the liquid crystal sealant composition (F3) brought about clogging and inferior discharge in dispenser coating and screen printing, and as a result, it was found that the liquid crystal sealant composition (F3) was markedly lackinglin coating work stability. Thus, it was not used for the subsequent bonding-sealing test.

Industrial Applicability

The liquid crystal sealant composition of the present invention is excellent in a linearity of seal lines and an accurate gap width-controlling property and has good storage stability and coating workability. It is suited to a single layer press hot bonding system and has high primary curing-adhesion reliability in the above system.

Further, a cured matter of the above liquid crystal sealant composition has a high glass transition temperature of 100° C. or higher and is excellent in a non-bleeding property, a non-seal leak property and a low moisture permeability. Also, it shows a low linear expansion coefficient. The presence of electrically conductive ions transferring from the composition can be controlled to a low level.

Accordingly, the liquid crystal sealant composition of the present invention is suited to a production of a liquid display cell, particularly a production thereof by the single layer press hot bonding system.

What is claimed is:

1. A liquid crystal sealant composition comprising an epoxy resin composition, wherein
   (a) an aqueous solution obtained by admixing said composition with the same mass of purified water has an ionic conductivity of 1 mS/m or less and
   (b) a coated material obtained by coating said epoxy resin composition in a thickness of 50 μm and subjecting it to heat treatment at 80 to 100° C. for 20 minutes is in B-stage and has a viscosity of 50 to 10000 Pa·s at 80 to 100° C. by an E type viscometer; and in a cured matter of the epoxy resin composition,
   (c) the cured matter of the composition has a linear expansion coefficient of $10 \times 10^{-5}$ mm/mm/° C. or less at 0° C. to 100° C., which is determined by means of a thermomechanical analyzer (TMA),
   (d) the cured matter of the composition has a glass transition temperature Tg of 100° C. or higher, which is determined by means of a thermomechanical analyzer (TMA), and

TABLE 1

| | Example | | | | | Comparative Example | | |
|---|---|---|---|---|---|---|---|---|
| | 1 | 2 | 3 | 4 | 5 | 1 | 2 | 3 |
| Liquid crystal sealant composition | E-1 | E-2 | E-3 | E-4 | E-5 | F-1 | F-2 | F3 |
| Storage stability test | ○ | ○ | ○ | ○ | ○ | ○ | Δ | x |
| Coating workability test | ○ | ○ | ○ | ○ | ○ | ○ | Δ | x |
| Bonding-sealing test | | | | | | | | |
| Presence of disturbance in seal lines | None | None | None | None | None | None | *1 | *2 |
| Presence of bubbles | None | None | None | None | None | None | | |
| Single layer hot press aptitude | Suited | Suited | Suited | Suited | Suited | Unsuited | Unsuited | Unsuited |
| Moisture permeability characteristic | ○ | ○ | ○ | ○ | ○ | Δ | | |
| Viscosity characteristic of B stage-reduced product at 80 to 100° C. by E type viscometer | ○ | ○ | ⊚ | ⊚ | ○ | x | | |
| Glass transition temperature of cured matter (° C.) | 134 | 133 | 127 | 115 | 105 | 135 | | |
| Linear expansion coefficient of cured matter ($\times 10^{-5}$ mm/° C.) | 5.2 | 5.3 | 4.7 | 4.9 | 5.9 | 5.2 | | |
| Water absorption coefficient of cured matter (%) | 2.7 | 2.6 | 1.9 | 2.0 | 2.0 | 2.6 | | |
| Free ion concentration measurement | ○ | ○ | ○ | ○ | ○ | ○ | | |
| Heat resistant peeling test of cell by wedge | ⊚ | ⊚ | ⊚ | ⊚ | ⊚ | ⊚ | | |
| Peeling test of cell by wedge after pressure cooker test | ○ | ⊚ | ⊚ | ⊚ | ⊚ | ○ | | |
| Non-bleeding property test of cell | ○ | ○ | ○ | ○ | ○ | Δ | | |
| Sealing function durability test | | | | | | | | |
| After 250 hours pass | ⊚ | ⊚ | ⊚ | ⊚ | ⊚ | ⊚ | | |
| After 500 hours pass | ⊚ | ⊚ | ⊚ | ⊚ | ⊚ | ⊚ | | |

*1: inferior gap-forming property
*2: impossible to enforce (e) a cured matter having a thickness of 100 μm which is formed from said composition has a moisture permeability of 200 g/m²·24 hours or less at 80° C. at which moisture passes through said cured matter.

2. The liquid crystal sealant composition as described in claim 1, comprising:
  (1) 20 to 88.9 mass % of an epoxy resin having 1.2 or more epoxy groups on an average in a molecule,
  (2) 1 to 15 mass % of a rubber-like polymer fine particle having a softening point of 0° C. or lower and a primary particle diameter of 5 μm or less,
  (3) 5 to 50 mass % of an inorganic filler,
  (4) 5 to 30 mass % of a thermally active potential curing agent for epoxy resin, and
  (5) 0.1 to 9.5 mass % of a high softening point-polymer fine particle having a softening point of 50° C. or higher and a primary particle diameter of 2 μm or less.

3. A production process for a liquid crystal display cell, comprising:
  printing or dispenser-coating the liquid crystal sealant composition as described in claim 2 on a bonding-sealing part of a glass-made or plastic-made substrate for a liquid crystal cell and precuring it at 70 to 120° C.,
  then adjusting the, position in a pair with a substrate which is not subjected to the treatment described above,
  subjecting the paired substrates to hot press treatment at 100 to 200° C. to bond and fix said paired substrates in a homogeneous thickness falling in a range of 3 to 7 μm to form a cell, and
  then charging a liquid crystal material into said cell and sealing the injection port with a two-liquid type liquid crystal sealant composition.

4. A liquid crystal display element obtained by:
  printing or dispenser-coating the liquid crystal sealant composition as described in claim 2 on a bonding-sealing part of a glass-made or plastic-made substrate for a liquid crystal cell and precuring it at 70 to 120° C.,
  then adjusting the position in a pair with a substrate which is not subjected to the treatment described above,
  subjecting the paired substrates to hot press treatment at 100 to 200° C. to bond and fix in a homogeneous thickness falling in a range of 3 to 7 μm to obtain a cell, and
  then charging a liquid crystal material into said cell and sealing the injection port with a two-liquid type liquid crystal sealant composition.

5. A production process for a liquid crystal display cell, comprising:
  printing or dispenser-coating the liquid crystal sealant composition as described in claim 1 on a bonding-sealing part of a glass-made-or plastic made substrate for a liquid crystal cell and precuring it at 70 to 120° C.,
  then adjusting the position in a pair with a substrate which is not subjected to the treatment described above,
  subjecting the paired substrates to hot press treatment at 100 to 200° C. to bond and fix said paired substrates in a homogeneous thickness falling in a range of 3 to 7 μm to form a cell, and
  then charging a liquid crystal material into said cell and sealing the injection port with a two-liquid type liquid crystal sealant composition.

6. A liquid crystal display element obtained by:
  printing or dispenser-coating the liquid crystal sealant composition as described in claim 1 on a bonding-sealing part of a glass-made or plastic-made substrate for a liquid crystal cell and precuring it at 70 to 120° C.,
  then adjusting the position in a pair with a substrate which is not subjected to the treatment described above,
  subjecting the paired substrates to hot press treatment at 100 to 200° C. to bond and fix in a homogeneous thickness falling in a range of 3 to 7 μm to obtain a cell, and
  then charging a liquid crystal material into said cell and sealing the injection port with a two-liquid type liquid crystal sealant composition.

7. A liquid crystal sealant composition comprising:
  (1) 20 to 88.9 mass % of an epoxy resin having 1.2 or more epoxy groups on an average in a molecule,
  (2) 1 to 15 mass % of a rubber-like polymer fine particle having a softening point of 0° C. or lower and a primary particle diameter of 5 μm or less,
  (3) 5 to 50 mass % of an inorganic filler,
  (4) 5 to 30 mass % of a thermally active potential curing agent for epoxy resin, and
  (5) 0.1 to 9.5 mass % of a high softening point-polymer fine particle having a softening point of 50° C. or higher and a primary particle diameter of 2 μm or less.

8. The liquid crystal sealant composition as described in claim 7, further comprising 0.1 to 5 mass % of a silane coupling agent (6) and 0.1 to 10 mass % of a curing accelerator (7).

9. A production process for a liquid crystal display cell, comprising:
  printing or dispenser-coating the liquid crystal sealant composition as described in claim 8 on a bonding-sealing part of a glass-made or plastic-made substrate for a liquid crystal cell and precuring it at 70 to 120° C.,
  then adjusting the position in a pair with a substrate which is not subjected to the treatment described above,
  subjecting the paired substrates to hot press treatment at 100 to 200° C. to bond and fix said paired substrates in a homogeneous thickness falling in a range of 3 to 7 μm to form a cell, and
  then charging a liquid crystal material into said cell and sealing the injection port with a two-liquid type liquid crystal sealant composition.

10. A liquid crystal display element obtained by:
  printing or dispenser-coating the liquid crystal sealant composition as described in claim 8 on a bonding-sealing part of a glass-made or plastic-made substrate for a liquid crystal cell and precuring it at 70 to 120° C.,
  then adjusting the position in a pair with a substrate which is not subjected to the treatment described above,
  subjecting the paired substrates to hot press treatment at 100 to 200° C. to bond and fix in a homogeneous thickness falling in a range of 3 to 7 μm to obtain a cell, and
  then charging a liquid crystal material into said cell and sealing the injection port with a two-liquid type liquid crystal sealant composition.

11. The liquid crystal sealant composition as described in claim 8, further comprising 1 to 25 mass % of a solvent (8) which is compatible with the epoxy resin and has a boiling point falling in a range of 150 to 230° C.

12. A production process for a liquid crystal display cell, comprising:
  printing or dispenser-coating the liquid crystal sealant composition as described in claim 11 on a bonding-sealing part of a glass-made or plastic-made substrate for a liquid crystal cell and precuring it at 70 to 120° C., then adjusting the position in a pair with a substrate which is not subjected to the treatment described above, subjecting the paired substrates to hot press treatment at 100 to 200° C. to bond and fix said paired substrates in a homogeneous thickness falling in a range of 3 to 7 μm to form a cell, and then charging a liquid crystal material into said cell and sealing the injection port with a two-liquid type liquid crystal sealant composition.

13. A liquid crystal display element obtained by:

printing or dispenser-coating the liquid crystal sealant composition as described in claim 11 on a bonding-sealing part of a glass-made or plastic-made substrate for a liquid crystal cell and precuring it at 70 to 120° C., then adjusting the position in a pair with a substrate which is not subjected to the treatment described above, subjecting the paired substrates to hot press treatment at 100 to 200° C. to bond and fix in a homogeneous thickness falling in a range of 3 to 7 μm to obtain a cell, and then charging a liquid crystal material into said cell and sealing the injection port with a two-liquid type liquid crystal sealant composition.

14. The liquid crystal sealant composition as described in claim 11, further comprising 0.1 to 5 mass % of a gap-forming controller (9).

15. A production process for a liquid crystal display cell, comprising:

printing or dispenser-coating the liquid crystal sealant composition as described in claim 14 on a bonding-sealing part of a glass-made or plastic-made substrate for a liquid crystal cell and precuring it at 70 to 120° C., then adjusting the position.in a pair with a substrate which is not subjected to the treatment described above, subjecting the paired substrates to hot press treatment at 100 to 200° C. to bond and fix said paired substrates in a homogeneous thickness falling in a range of 3 to 7 μm to form a cell, and then charging a liquid crystal material into said cell and sealing the injection port with a two-liquid type liquid crystal sealant composition.

16. A liquid crystal display element obtained by:

printing or dispenser-coating the liquid crystal sealant composition as described in claim 14 on a bonding-sealing part of a glass-made or plastic-made substrate for a liquid crystal cell and precuring it at 70 to 120° C., then adjusting the position in a pair with a substrate which is not subjected to the treatment described above, subjecting the paired substrates to hot press treatment at 100 to 200° C. to bond and fix in a homogeneous thickness falling in a range of 3 to 7 μm to obtain a cell, and then charging a liquid crystal material into said cell and sealing the injection port with a two-liquid type liquid crystal sealant composition.

17. The liquid crystal sealant composition as described in claim 11, wherein the solvent (8) is at least one selected from a ketone solvent, an ether solvent and an ester solvent each having a boiling point falling in a range of 150 to 230° C.

18. A production process for a liquid crystal display cell, comprising:

printing or dispenser-coating the liquid crystal sealant composition as described in claim 17 on a bonding-sealing part of a glass-made or plastic-made substrate for a liquid crystal cell and precuring it at 70 to 120° C., then adjusting the position in a pair with a substrate which is not subjected to the treatment described above, subjecting the paired substrates to hot press treatment at 100 to 200° C. to bond and fix said paired substrates in a homogeneous thickness falling in a range of 3 to 7 μm to form a cell, and then charging a liquid crystal material into said cell and sealing the injection port with a two-liquid type liquid crystal sealant composition.

19. A liquid crystal display element obtained by:

printing or dispenser-coating the liquid crystal sealant composition as described in claim 17 on a bonding-sealing part of a glass-made or plastic-made substrate for a liquid crystal cell and precuring it at 70 to 120° C., then adjusting the position in a pair with a substrate which is not subjected to the treatment described above, subjecting the paired substrates to hot press treatment at 100 to 200° C. to bond and fix in a homogeneous thickness falling in a range of 3 to 7 μm to obtain a cell, and then charging a liquid crystal material into said cell and sealing the injection port with a two-liquid type liquid crystal sealant composition.

20. The liquid crystal sealant composition as described in claim 7, wherein a maximum exothermic peak temperature determined from a thermogram obtained by differential scanning calorimetry (DSC) in which 10 mg of the composition is heated at a constant rate of 5° C./minute in an inert gas atmosphere falls in a range of 135 to 180° C.

21. A production process for a liquid crystal display cell, comprising:

printing or dispenser-coating the liquid crystal sealant composition as described in claim 20 on a bonding-sealing part of a glass-made or plastic-made substrate for a liquid crystal cell and precuring it at 70 to 120° C., then adjusting the position in a pair with a substrate which is not subjected to the treatment described above, subjecting the paired substrates to hot press treatment at 100 to 200° C. to bond and fix said paired substrates in a homogeneous thickness falling in a range of 3 to 7 μm to form a cell, and then charging a liquid crystal material into said cell and sealing the injection port with a two-liquid type liquid crystal sealant composition.

22. A liquid crystal display element obtained by:

printing or dispenser-coating the liquid crystal sealant composition as described in claim 20 on a bonding-sealing part of a glass-made or plastic-made substrate for a liquid crystal cell and precuring it at 70 to 120° C., then adjusting the position in a pair with a substrate which is not subjected to the treatment described above, subjecting the paired substrates to hot press treatment at 100 to 200° C. to bond and fix in a homogeneous thickness falling in a range of 3 to 7 μm to obtain a cell, and then charging a liquid crystal material into said cell and sealing the injection port with a two-liquid type liquid crystal sealant composition.

23. The liquid crystal sealant composition as described in claim 7, wherein the composition is a single-liquid type epoxy resin composition, and an exothermic initiation temperature determined from a thermogram obtained by differential scanning calorimetry (DSC) in which 10 mg of the liquid crystal sealant composition is heated at a constant rate of 5° C./minute in an inert gas atmosphere falls in a range of 60 to 130° C.

24. A production process for a liquid crystal display cell, comprising:
printing or dispenser-coating the liquid crystal sealant composition as described in claim 23 on a bonding-sealing part of a glass-made or plastic-made substrate for a liquid crystal cell and precuring it at 70 to 120° C.,
then adjusting the position in a pair with a substrate which is not subjected to the treatment described above,
subjecting the paired substrates to hot press treatment at 100 to 200° C. to bond and fix said paired substrates in a homogeneous thickness falling in a range of 3 to 7 μm to form a cell, and
then charging a liquid crystal material into said cell and sealing the injection port with a two-liquid type liquid crystal sealant composition.

25. A liquid crystal display element obtained by:
printing or dispenser-coating the liquid crystal sealant composition as described in claim 23 on a bonding-sealing part of a glass-made or plastic-made substrate for a liquid crystal cell and precuring it at 70 to 120° C.,
then adjusting the position in a pair with a substrate which is not subjected to the treatment described above,
subjecting the paired substrates to hot press treatment at 100 to 200° C. to bond and fix in a homogeneous thickness falling in a range of 3 to 7 μm to obtain a cell, and
then charging a liquid crystal material into said cell and sealing the injection port with a two-liquid type liquid crystal sealant composition.

26. The liquid crystal sealant composition as described in claim 7, wherein the epoxy resin (1) is an epoxy resin having 1.7 or more epoxy groups on an average in a molecule and has a polystyrene-reduced number average molecular weight of 7000 or less which is determined by gel permeation chromatography measurement.

27. A production process for a liquid crystal display cell, comprising:
printing or dispenser-coating the liquid crystal sealant composition as described in claim 26 on a bonding-sealing part of a glass-made or plastic-made substrate for a liquid crystal cell and precuring it at 70 to 120° C.,
then adjusting the position in a pair with a substrate which is not subjected to the treatment described above,
subjecting the paired substrates to hot press treatment at 100 to 200° C. to bond and fix said paired substrates in a homogeneous thickness falling in a range of 3 to 7 μm to form a cell, and
then charging a liquid crystal material into said cell and sealing the injection port with a two-liquid type liquid crystal sealant composition.

28. A liquid crystal display element obtained by:
printing or dispenser-coating the liquid crystal sealant composition as described in claim 26 on a bonding-sealing part of a glass-made or plastic-made substrate for a liquid crystal cell and precuring it at 70 to 120° C.,
then adjusting the position in a pair with a substrate which is not subjected to the treatment described above,
subjecting the paired substrates to hot press treatment at 100 to 200° C. to bond and fix in a homogeneous thickness falling in a range of 3 to 7 μm to obtain a cell, and
then charging a liquid crystal material into said cell and sealing the injection port with a two-liquid type liquid crystal sealant composition.

29. The liquid crystal sealant composition as described in claim 7, wherein the components (2) and (5) are present in the state that they are dispersed in the epoxy resin in the form of particles respectively.

30. A production process for a liquid crystal display cell, comprising:
printing or dispenser-coating the liquid crystal sealant composition as described in claim 29 on a bonding-sealing part of a glass-made or plastic-made substrate for a liquid crystal cell and precuring it at 70 to 120° C.,
then adjusting the position in a pair with a substrate which is not subjected to the treatment described above,
subjecting the paired substrates to hot press treatment at 100 to 200° C. to bond and fix said paired substrates in a homogeneous thickness falling in a range of 3 to 7 μm to form a cell, and
then charging a liquid crystal material into said cell and sealing the injection port with a two-liquid type liquid crystal sealant composition.

31. A liquid crystal display element obtained by:
printing or dispenser-coating the liquid crystal sealant composition as described in claim 29 on a bonding-sealing part of a glass-made or plastic-made substrate for a liquid crystal cell and precuring it at 70 to 120° C.,
then adjusting the position in a pair with a substrate which is not subjected to the treatment described above,
subjecting the paired substrates to hot press treatment at 100 to 200° C. to bond and fix in a homogeneous thickness falling in a range of 3 to 7 μm to obtain a cell, and
then charging a liquid crystal material into said cell and sealing the injection port with a two-liquid type liquid crystal sealant composition.

32. The liquid crystal sealant composition as described in claim 7, wherein said component (5) is a high softening point-polymer fine particle which comprises a poly(meth)acrylate having a micro crosslinking structure as a main component and has a softening point of 60 to 150° C. and a primary particle diameter falling in a range of 0.01 to 2 μm and which contains an epoxy group introduced into a polymer component in a proportion of 0.1 to 5 mass %.

33. A production process for a liquid crystal display cell, comprising:
printing or dispenser-coating the liquid crystal sealant composition as described in claim 32 on a bonding-sealing part of a glass-made or plastic-made substrate for a liquid crystal cell and precuring it at 70 to 120° C.,
then adjusting the position in a pair with a substrate which is not subjected to the treatment described above,
subjecting the paired substrates to hot press treatment at 100 to 200° C. to bond and fix said paired substrates in a homogeneous thickness falling in a range of 3 to 7 μm to form a cell, and
then charging a liquid crystal material into said cell and sealing the injection port with a two-liquid type liquid crystal sealant composition.

34. A liquid crystal display element obtained by:
printing or dispenser-coating the liquid crystal sealant composition as described in claim 32 on a bonding-sealing part of a glass-made or plastic-made substrate for a liquid crystal cell and precuring it at 70 to 120° C.,
then adjusting the position in a pair with a substrate which is not subjected to the treatment described above, subjecting the paired substrates to hot press treatment at 100 to 200° C. to bond and fix in a homogeneous thickness falling in a range of 3 to 7 μm to obtain a cell, and then charging a liquid crystal material into said cell and sealing the injection port with a two-liquid type liquid crystal sealant composition.

35. The liquid crystal sealant composition as described in claim 7, wherein at least a part of the component (3) is graft-bonded with 1 to 50 mass parts of the component (1) or (6) per 100 mass parts of the component (3) in terms of a grafting rate represented by a mass increasing rate determined by a repetitive solvent-washing method.

36. A production process for a liquid crystal display cell, comprising:

printing or dispenser-coating the liquid crystal sealant composition as described in claim 35 on a bonding-sealing part of a glass-made or plastic-made substrate for a liquid crystal cell and precuring it at 70 to 120° C., then adjusting the position in a pair with a substrate which is not subjected to the treatment described above, subjecting the paired substrates to hot press treatment at 100 to 200° C. to bond and fix said paired substrates in a homogeneous thickness falling in a range of 3 to 7 μm to form a cell, and then charging a liquid crystal material into said cell and sealing the injection port with a two-liquid type liquid crystal sealant composition.

37. A liquid crystal display element obtained by:

printing or dispenser-coating the liquid crystal sealant composition as described in claim 35 on a bonding-sealing part of a glass-made or plastic-made substrate for a liquid crystal cell and precuring it at 70 to 120° C., then adjusting the position in a pair with a substrate which is not subjected to the treatment described above, subjecting the paired substrates to hot press treatment at 100 to 200° C. to bond and fix in a homogeneous thickness falling in a range of 3 to 7 μm to obtain a cell, and then charging a liquid crystal material into said cell and sealing the injection port with a two-liquid type liquid crystal sealant composition.

38. The liquid crystal sealant composition as described in claim 7, wherein the rubber-like polymer fine particle (2) and the high softening point-polymer fine particle (5) form a core/shell type composite fine particle in which the rubber-like polymer fine particle (2) forms the core phase and the high softening point-polymer fine particle (5) forms the shell phase.

39. A production process for a liquid crystal display cell, comprising:

printing or dispenser-coating the liquid crystal sealant composition as described in claim 38 on a bonding-sealing part of a glass-made or plastic-made substrate for a liquid crystal cell and precuring it at 70 to 120° C., then adjusting the position in a pair with a substrate which is not subjected to the treatment described above, subjecting the paired substrates to hot press treatment at 100 to 200° C. to bond and fix said paired substrates in a homogeneous thickness falling in a range of 3 to 7 μm to form a cell, and then charging a liquid crystal material into said cell and sealing the injection port with a two-liquid type liquid crystal sealant composition.

40. A liquid crystal display element obtained by:

printing or dispenser-coating the liquid crystal sealant composition as described in claim 38 on a bonding-sealing part of a glass-made or plastic-made substrate for a liquid crystal cell and precuring it at 70 to 120° C., then adjusting the position in a pair with a substrate which is not subjected to the treatment described above, subjecting the paired substrates to hot press treatment at 100 to 200° C. to bond and fix in a homogeneous thickness falling in a range of 3 to 7 μm to obtain a cell, and then charging a liquid crystal material into said cell and sealing the injection port with a two-liquid type liquid crystal sealant composition.

41. A production process for a liquid crystal display cell, comprising:

printing or dispenser-coating the liquid crystal sealant composition as described in claim 7 on a bonding-sealing part of a glass-made or plastic-made substrate for a liquid crystal cell and precuring it at 70 to 120° C., then adjusting the position in a pair with a substrate which is not subjected to the treatment described above, subjecting the paired substrates to hot press treatment at 100 to 200° C. to bond and fix said paired substrates in a homogeneous thickness falling in a range of 3 to 7 μm to form a cell, and then charging a liquid crystal material into said cell and sealing the injection port with a two-liquid type liquid crystal sealant composition.

42. A liquid crystal display element obtained by:

printing or dispenser-coating the liquid crystal sealant composition as described in claim 7 on a bonding-sealing part of a glass-made or plastic-made substrate for a liquid crystal cell and precuring it at 70 to 120° C., then adjusting the position in a pair with a substrate which is not subjected to the treatment described above, subjecting the paired substrates to hot press treatment at 100 to 200° C. to bond and fix in a homogeneous thickness falling in a range of 3 to 7 μm to obtain a cell, and then charging a liquid crystal material into said cell and sealing the injection port with a two-liquid type liquid crystal sealant composition.

* * * * *

UNITED STATES PATENT AND TRADEMARK OFFICE
CERTIFICATE OF CORRECTION

PATENT NO.   : 6,555,187 B1  
DATED        : April 29, 2003  
INVENTOR(S)  : Tadashi Kitamura It is certified that error appears in the above-identified patent and that said Letters Patent is hereby corrected as shown below:

<u>Title page,</u>  
Item [22], PCT Filed, change "Nov. 30, 2000" to -- Mar. 30, 2000 --.  
Insert Items:
-- [86]  PCT No.:          PCT/JP00/02024

§ 371 (c)(1),  
(2), (4) Date:     Nov. 30, 2000

[87]  PCT Pub. No.:     WO00/60005

PCT Pub. Date:    Oct. 12, 2000 --.

Signed and Sealed this

Fourteenth Day of February, 2006

JON W. DUDAS  
*Director of the United States Patent and Trademark Office*